(12) United States Patent
Jorgovanovic

(10) Patent No.: US 9,763,244 B1
(45) Date of Patent: Sep. 12, 2017

(54) ADAPTIVE DATA FRAME AGGREGATION

(71) Applicant: Amazon Technologies, Inc., Seattle, WA (US)

(72) Inventor: Milos Jorgovanovic, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 97 days.

(21) Appl. No.: 14/743,272

(22) Filed: Jun. 18, 2015

(51) Int. Cl.
*H04W 72/04* (2009.01)
*H04L 5/14* (2006.01)
*H04W 4/00* (2009.01)
*H04W 88/06* (2009.01)

(52) U.S. Cl.
CPC ....... *H04W 72/0446* (2013.01); *H04L 5/1461* (2013.01); *H04W 4/008* (2013.01); *H04W 72/048* (2013.01); *H04W 88/06* (2013.01)

(58) Field of Classification Search
CPC ................................................. H04W 72/0446
See application file for complete search history.

(56) References Cited

U.S. PATENT DOCUMENTS

| 2006/0056443 | A1* | 3/2006 | Tao | H04W 28/06 370/462 |
| 2006/0062247 | A1* | 3/2006 | Li | H04L 5/0007 370/465 |
| 2007/0021066 | A1* | 1/2007 | Dravida | H04W 16/14 455/41.2 |
| 2010/0103912 | A1* | 4/2010 | Suzuki | H04W 72/1247 370/338 |
| 2012/0140650 | A1* | 6/2012 | Bruhn | H04W 28/065 370/252 |
| 2013/0201857 | A1* | 8/2013 | Bhargava | H04K 3/222 370/252 |
| 2013/0260686 | A1* | 10/2013 | Mukherjee | G06F 9/5027 455/41.2 |
| 2013/0343236 | A1* | 12/2013 | Chen | H04W 88/06 370/278 |
| 2014/0071954 | A1* | 3/2014 | Au | H04W 72/0446 370/336 |
| 2015/0271074 | A1* | 9/2015 | Hirth | H04L 47/12 398/68 |
| 2016/0037515 | A1* | 2/2016 | Xie | H04L 5/0055 370/329 |

* cited by examiner

*Primary Examiner* — Jason Mattis
(74) *Attorney, Agent, or Firm* — Eversheds Sutherland (US) LLP

(57) ABSTRACT

First data may be transmitted during a first timeslot of a transmission time period using a first wireless communication standard and second data may be transmitted during a second timeslot of the transmission time period using a second wireless communication standard. Based on change(s) to one or more characteristics associated with data transmitted using the first wireless communication standard, such as a change in the wireless profile or wireless protocol being used, a duration of the transmission time period may be adaptively increased and/or a duration of the first timeslot may be adaptively decreased. In either scenario, a duration of the second timeslot may increase. This increase in the duration of the second timeslot may result in an increase in a frame aggregation count associated with the second wireless communication standard, allowing more data frames to be aggregated into a single packet, thereby increasing packet length and data throughput.

20 Claims, 6 Drawing Sheets

ADAPTIVE DATA FRAME AGGREGATION

BACKGROUND

Some electronic devices are capable of transmitting and receiving data using different wireless communication standards or protocols. For example, many smartphones and tablets and some content streaming devices are capable of transmitting and receiving data using one or more protocols of the Bluetooth wireless communication standard and are also capable of transmitting and receiving data using one or more protocols of the Institute of Electrical and Electronics Engineers (IEEE) 802.11 family of wireless communication standards (collectively referred to as WiFi).

Bluetooth operates in the 2.4 GHz portion of the radio frequency (RF) spectrum. Certain WiFi protocols such as 802.11b, 802.11g, 802.11n, etc. also operate in the 2.4 GHz band. This co-existence of Bluetooth and certain WiFi protocols in the 2.4 GHz portion of the RF spectrum may result in interference between Bluetooth and WiFi transmissions. Various interference mitigation techniques may be employed to reduce the likelihood of Bluetooth and WiFi interference such as, for example, temporal, spatial, or frequency isolation techniques. An example spatial isolation technique involves placing Bluetooth and WiFi radios as far apart as possible, and when possible, placing insulating material between them in order to mitigate interference between Bluetooth and WiFi transmissions. An example frequency isolation technique is adaptive frequency hopping according to which a Bluetooth radio scans the operating band for interference on operating channels and avoids noisy channels and operates only on those channels identified as clear. An example temporal isolation technique is time division duplexing in which the Bluetooth and WiFi radios of a device transmit or receive data during designated, non-overlapping timeslots.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical components; however, different reference numerals may be used to identify similar or identical components as well. Various embodiments may utilize element(s) and/or component(s) other than those illustrated in the drawings and some element(s) and/or component(s) may not be present in various embodiments. The use of singular terminology to describe a component or element may, depending on the context, encompass a plural number of such components or elements and vice versa.

DETAILED DESCRIPTION

Overview

Figure 1:
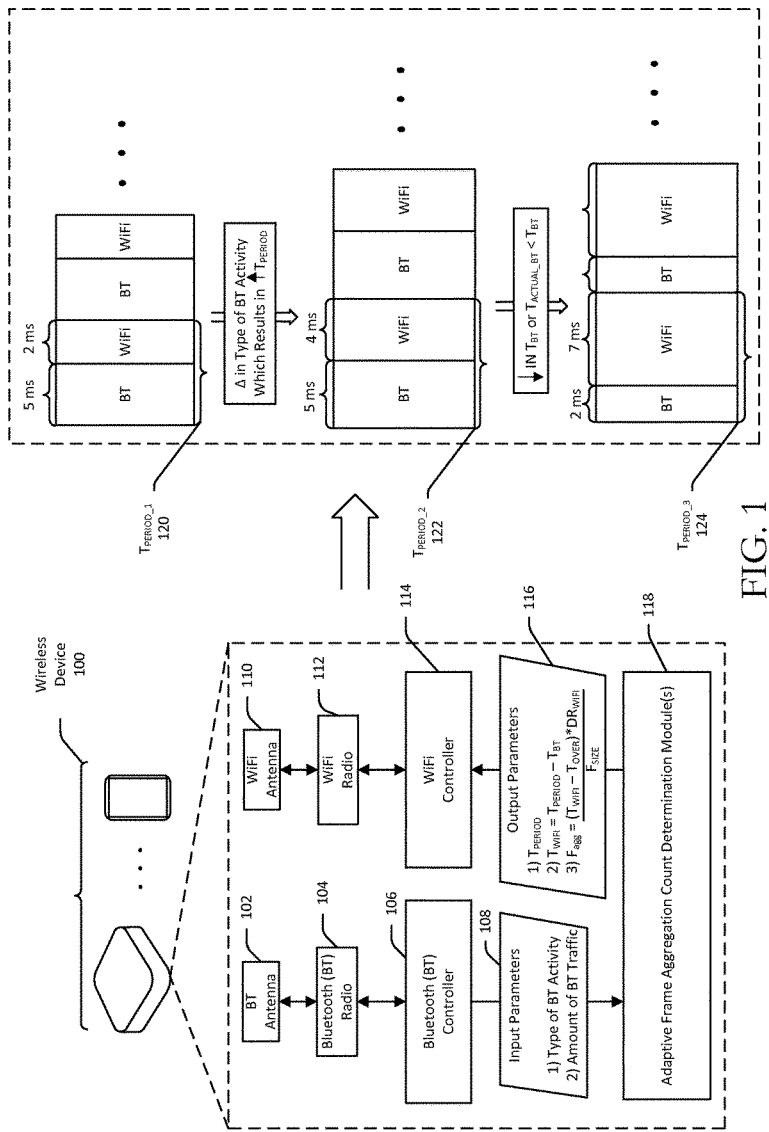
FIG. 1 schematically depicts a high level overview of a process for adaptively determining a frame aggregation count for a WiFi protocol based on a change in the type of Bluetooth activity and/or a change in the amount of Bluetooth data traffic in accordance with one or more example embodiments of the disclosure.

This disclosure relates to systems, methods, computer-readable or machine-readable media, techniques, and methodologies for adaptively determining a frame aggregation count for a wireless communication standard. In certain example embodiments of the disclosure, one or more adaptive frame aggregation count determination (AFACD) modules may determine one or more characteristics associated with data traffic transmitted using a first wireless communication standard. The AFACD module(s) may then determine a transmission time period for transmitting first data using the first wireless communication standard and second data using a second wireless communication standard and allocate a first timeslot of the transmission time period for transmission of the first data using the first wireless communication standard. The AFACD module(s) may then determine a duration of a second timeslot of the transmission time period available for transmitting the second data using the second wireless communication standard. Based at least in part on the duration of the second timeslot, the AFACD module(s) may determine a frame aggregation count for the second wireless communication standard. The AFACD module(s) may utilize other parameters in addition to the duration of the second timeslot to determine the frame aggregation count such as, for example, a transmission data rate (e.g., a bit rate) associated with the second wireless communication standard, a duration of time associated with transmission overhead, and a current frame size.

In certain example embodiments of the disclosure, the first wireless communication standard may be the Bluetooth wireless communication standard, any of the IEEE 802.15.4 family of wireless communication standards (e.g., ZigBee), or the like. The second wireless communication standard may be a WiFi wireless communication standard. The term wireless communication standard may at times be used interchangeably with the term wireless protocol. For example, a WiFi communication standard may be synonymous with a WiFi protocol. At other times herein, the term wireless communication standard may encompass a group of associated protocols. For example, a number of different Bluetooth protocols are defined for transmission and receipt of data in accordance with the Bluetooth wireless communication standard.

A frame aggregation count (also referred to herein at times as a frame aggregation parameter) may denote the number of data frames at a first network layer that can be aggregated into a single data packet at a second network layer that is at a lower level in a network layer hierarchy than the first network layer. In certain example embodiments of the disclosure, the frame aggregation count for a WiFi protocol may indicate the number of Media Access Control (MAC) layer service data units (MSDUs) that can be aggregated into a single physical (PHY) layer packet. More specifically, the frame aggregation count may indicate the number of MSDUs that can be aggregated into a single MAC layer protocol data unit (MPDU) that can be delivered to the PHY layer as a single unit for transmission. An MPDU may be contained in the payload (e.g., the PHY layer service data unit (PSDU)) of a PHY layer protocol data unit (PPDU).

As the frame aggregation count increases, a greater number of MSDUs can be aggregated into a single PHY layer packet, thereby resulting in longer packets. Longer packets contain a greater number of bits in the payload. Longer packets thus result in greater throughput at higher network layers in the network hierarchy. Conversely, as the frame aggregation count decreases, the packet length also decreases, resulting in lower data throughput.

The length of a packet may depend on a transmission data rate (e.g., a bit rate) in addition to the frame aggregation count. More specifically, the packet length may be defined as the sum of some fixed overhead (e.g., the number of bits in header fields of the packet) and a value that is proportional to the frame aggregation count divided by the transmission data rate. The value that is proportional to the frame aggregation count divided by the transmission data rate may be, for example, the length of data frames that are aggregated into the packet multiplied by the number of data frames as determined by the frame aggregation count.

Thus, the frame aggregation count is directly proportional to the payload packet length and the transmission data rate is inversely proportional to the payload packet length. The payload packet length may be a difference between a total length (e.g., in bits) of the packet and an amount of overhead. The overhead may include, for example, the packet overhead (e.g., header data) as well as over-the-air overhead associated with the wireless transmission standard being used (e.g., a WiFi protocol). The over-the-air overhead may include a Short Interframe Space (SIFS) time, signal propagation time, and so forth. A SIFS time may be an amount of time required for a wireless interface to process a received frame and respond with a response frame and may correspond to a difference in time between the last symbol of a received frame and the first symbol of a response frame. A SIFS time may be a combination of various delays such as, for example, a Physical Layer Conversion Protocol (PLCP) delay, a MAC processing delay, and so forth.

The transmission data rate may be inversely related to the payload packet length by virtue of being inversely related to the data frame length. That is, as the transmission data rate increases, the amount of information that can be conveyed per unit time increases, thereby reducing the data frame length required for a given amount of information. Further, since an increase in the data transmission rate allows for a shorter data frame length, this, in turn, allows for an increased frame aggregation count. Accordingly, as long as the duration of the timeslots available for WiFi transmission (which will be discussed in more detail hereinafter in this disclosure) and the duration of WiFi overhead is unchanged, an increase in the transmission data rate may cause a decrease in the data frame length, which, in turn, allows for an increased frame aggregation count to be used, and thus, a higher data throughput and more efficient communication to be achieved.

For example, in the case of a WiFi protocol, the length of a WiFi packet ($L_{WIFI}$) may depend on the WiFi data transmission rate ($DR_{WIFI}$) and the frame aggregation count ($F_{AGG}$). More specifically, the WiFi packet length may be equal to the sum of some fixed overhead (e.g., the number of bits in header fields of the packet) and a value that is proportional to $F_{AGG}/DR_{WIFI}$. The value that is proportional to $F_{AGG}/DR_{WIFI}$ may be the length of a WiFi frame (e.g., the length of an MSDU) multiplied by the number of frames (e.g. $F_{AGG}$).

A client device may communicate the frame aggregation count to a server device. For example, a WiFi client may indicate the frame aggregation count to a WiFi access point. The WiFi access point may utilize the frame aggregation count received from the WiFi client to determine the number of MSDUs to aggregate into a single PHY layer packet sent to the WiFi client. In certain example embodiments, a WiFi client may request a particular frame aggregation count for WiFi transmissions received from a WiFi access point, and whether the WiFi access point uses the requested frame aggregation count may be within its discretion.

A network layer hierarchy may be defined by, for example, the Open Systems Interconnection (OSI) model. In the OSI model, similar communication functions are grouped into the same layer. The OSI model specifies a hierarchy of abstraction layers in which a particular layer may serve the layer above it and may be served by the layer below it. The OSI model specifies seven logical layers including the application layer, the presentation layer, the session layer, the transport layer, the network layer, the data link layer, and the physical layer. The data link layer may include the logical link control (LLC) sub-layer and the MAC sub-layer. The LLC sub-layer may lie above the MAC sub-layer in the OSI model hierarchy. In certain example embodiments of the disclosure, the first network layer referenced above may be the MAC sub-layer and the second network layer referenced above may be the physical layer. The Internet protocol stack is an alternative model for describing the logical hierarchy of the variety of network protocols that govern the architecture of the Internet. The Internet protocol stack includes the application layer, the transport layer, the network layer, the link layer, and the physical layer.

The co-existence of the Bluetooth wireless transmission standard and certain WiFi protocols in the 2.4 GHz portion of the RF spectrum may result in interference between Bluetooth and WiFi transmissions. Both Bluetooth and WiFi utilize spread spectrum radio transmission techniques in which a narrowband signal is spread across a given portion of the RF spectrum. Bluetooth utilizes Frequency Hopping Spread Spectrum (FHSS) according to which a narrowband signal is spread by "hopping" across a given frequency band. Bluetooth transmits on any one of 79 1 MHz channels or frequencies within the 2.4 GHz band of the RF spectrum. FHSS operates by changing transmission frequencies at set intervals, which in the case of Bluetooth is 1,600 times per second.

WiFi, on the other hand, utilizes Direct Sequence Spread Spectrum (DSSS) according to which a narrowband signal is divided and then combined with a sequence referred to as a chipping code. The chipping code spreads multiple copies of the original signal across a wider portion of the operating band to form a channel. The number of non-overlapping channels that are available for transmission may be determined by the channel width and the overall width of the operating band. For example, in the case of certain WiFi protocols that operate in the same 2.4 GHz band as Bluetooth (e.g., 802.11b, 802.11g, etc.), the channels may be 22 MHz wide, resulting in three non-overlapping WiFi channels due to the 2.4 GHz band being 83 MHz wide.

Due to the differing radio transmission techniques utilized by Bluetooth and WiFi, interference can occur between Bluetooth and WiFi data transmissions such as when a Bluetooth radio hops to a frequency occupied by an active WiFi channel. Because a FHSS receiver cannot decode a DSSS transmission (and vice versa), a transmission using one radio transmission technique is interpreted as noise by another receiver utilizing a different radio transmission technique. If the interference is sufficiently strong that a Bluetooth or WiFi receiver cannot decode a transmission, the transmission may need to be resent, which may result in a decrease in performance. In extreme cases, a device may lose Bluetooth and/or WiFi connectivity.

Various interference mitigation techniques may be employed to reduce the likelihood of Bluetooth and WiFi interference such as, for example, temporal, spatial, or frequency isolation techniques. An example temporal isolation technique is time division duplexing in which the Bluetooth and WiFi radios of a device transmit/receive data during designated, non-overlapping timeslots. One or more characteristics associated with Bluetooth transmissions may determine the periodicity of the Bluetooth transmissions as well as the duration of the timeslot allocated for the Bluetooth transmissions. The one or more characteristics may include, for example, a Bluetooth profile being used for the data transmissions, a Bluetooth protocol being used for the data transmissions, and so forth.

The Bluetooth wireless transmission standard includes a variety of Bluetooth profiles. A Bluetooth profile is a specification that pertains to one or more aspects of Bluetooth-based wireless communication between devices. A Bluetooth profile may incorporate certain features of a Bluetooth core specification and may utilize one or more Bluetooth protocols to enable one or more aspects of Bluetooth-based wireless communication. In addition, a Bluetooth profile may serve as the basis for one or more other Bluetooth profiles by defining one or more aspects of Bluetooth-based wireless communication that are applicable to other Bluetooth profiles. For example, the Generic Access Profile (GAP) is a Bluetooth profile that serves as the basis for all other Bluetooth profiles. GAP defines how two Bluetooth-enabled devices discover and establish a connection with one another.

In addition, the Bluetooth wireless communication standard utilizes a variety of Bluetooth protocols. The Bluetooth protocol stack is split in two parts: a "controller stack" containing the radio interface and a "host stack" that manages high level data. The controller stack may be implemented in an integrated chip containing the Bluetooth radio and a microprocessor. The host stack may be implemented as part of an operating system, as an installable software package, or the like.

An example Bluetooth profile is the Advanced Audio Distribution Profile (A2DP). This profile defines how multimedia audio can be streamed from one device to another over a Bluetooth connection (e.g., from a mobile phone or laptop/desktop computer to a wireless headset). A2DP enables unidirectional transfer of an audio stream in up to 2-channel stereo either to or from a Bluetooth host. A2DP may utilize various Bluetooth protocols such as, for example, the Audio/Video Distribution Transport Protocol (AVDTP).

Another example Bluetooth profile is the Hands-Free Profile (HFP). HFP is commonly used to allow vehicle hands-free kits to communicate with mobile phones in the vehicle. HFP may use the Synchronous connection-oriented (SCO) or Enhanced SCO (eSCO) protocols to establish a radio link for carrying a modulated monaural audio signal. Most Bluetooth headsets implement both HFP and Headset Profile—the most commonly used Bluetooth profile—which provides support for the use of Bluetooth headsets with mobile devices.

Yet another example Bluetooth profile is the Human Interface Device (HID) Profile that provides support for peripheral Bluetooth-enabled devices such as mice, joysticks, keyboards, game controllers, etc. The HID profile is designed to provide a low latency link with low power requirements.

Different Bluetooth profiles may require different periodicities of Bluetooth transmissions. For example, the HID profile may require a shorter period than HFP due to the need for more frequent Bluetooth communication between a peripheral device, such as a game controller, and a Bluetooth host device such as a content streaming device. Similarly, different Bluetooth protocols may be associated with different periodicities. The type of Bluetooth profile(s) and/or the type of Bluetooth protocol(s) used for Bluetooth communication may be referred to herein generally as the type of Bluetooth activity.

The periodicity of Bluetooth transmissions may define a total transmission time period ($T_{PERIOD}$) for transmitting first data using Bluetooth and for transmitting second data using a protocol associated with a different wireless communication standard (a WiFi protocol). In addition to determining the periodicity of Bluetooth transmissions, the type of Bluetooth activity may determine the duration $T_{BT}$ of timeslots allocated for Bluetooth transmissions. The AFACD module(s) may utilize the total transmission time $T_{PERIOD}$ and the duration $T_{BT}$ of timeslots allocated for Bluetooth transmissions to determine the duration $T_{WIFI}$ of timeslots available for transmitting data using a WiFi protocol. More specifically, the AFACD module(s) may determine $T_{WIFI}$ based on the following relationship: $T_{PERIOD}=T_{BT}+T_{WIFI}$. The AFACD module(s) may then determine the frame aggregation count $F_{AGG}$ using $T_{WIFI}$ and various other parameters.

The various other parameters that may impact the determination of the $F_{AGG}$ for data transmissions that use, for example, a WiFi protocol may include, without limitation, the WiFi data transmission rate $DR_{WIFI}$, the amount of transmission time associated with overhead $T_{OVER}$, and the current frame size. $DR_{WIFI}$ may be a measure of the amount of data transmitted using a WiFi protocol divided by the amount of time required to transmit the data (e.g., Mbps).

$DR_{WIFI}$ may be a function of one or more conditions associated with a WiFi channel. For example, an increase in the signal-to-noise (SNR) for a WiFi channel may lead to an increase in $DR_{WIFI}$. $T_{OVER}$ may be the amount of time needed to transmit non-payload data such as, for example, header data. Header data may include a frame control field, a sequence number, source and destination addresses, and so forth. $T_{OVER}$ may also include latency time associated with switching from Bluetooth transmission to WiFi transmission. $T_{OVER}$ may further include over-the-air overhead associated with the WiFi protocol.

In certain example embodiments, the AFACD module(s) may determine $F_{AGG}$ based on the following relationship: $F_{AGG}=(T_{WIFI}-T_{OVER})*DR_{WIFI}/$Current Frame Size ($F_{SIZE}$). As previously noted, $T_{WIFI}$ may be equal to $T_{PERIOD}-T_{BT}$, and thus, may represent the duration of a timeslot available for WiFi transmission within a transmission time period that also includes a timeslot allocated for Bluetooth transmission. $T_{WIFI}-T_{OVER}$ may represent the amount of time actually available for WiFi transmission after taking into account any time delay associated with switching from Bluetooth transmission to WiFi transmission and/or time required to transmit header data. As previously noted, for a given $T_{WIFI}-T_{OVER}$, as $DR_{WIFI}$ increases, $F_{AGG}$ may also increase, and as $DR_{WIFI}$ decreases, $F_{AGG}$ may also decrease. In addition, for a given $DR_{WIFI}$, as $T_{WIFI}-T_{OVER}$ increases, $F_{AGG}$ may also increase, and as $T_{WIFI}-T_{OVER}$ decreases, $F_{AGG}$ may also decrease. In certain example embodiments, a weighting factor may be applied to the expression above to yield $F_{AGG}$.

As previously noted, the type of Bluetooth activity such as, for example, a Bluetooth profile being used and/or a Bluetooth protocol being used may determine $T_{PERIOD}$ and $T_{BT}$. The AFACD module(s) may monitor Bluetooth activity to determine when a change occurs in the type of Bluetooth activity. For example, the AFACD module(s) may monitor Bluetooth transmissions to determine when a Bluetooth profile being used has changed and/or when a Bluetooth protocol being used has changed. In certain example embodiments, a Bluetooth controller of a wireless device may provide the AFACD module(s) with an indication of a Bluetooth profile and/or a Bluetooth protocol being used for Bluetooth data transmissions. Upon determining that a change in Bluetooth activity has occurred, the AFACD module(s) may further determine a new $T_{PERIOD}$ and/or $T_{BT}$ associated with the change in the Bluetooth activity. More specifically, if a Bluetooth profile and/or a Bluetooth protocol being used has changed, the AFACD module(s) may determine a new $T_{PERIOD}$ and/or $T_{BT}$ associated with the new Bluetooth profile and/or new Bluetooth protocol being used.

In certain example embodiments, a change in Bluetooth activity may result in an increase in $T_{PERIOD}$. This may be the case, for example, if a Bluetooth profile and/or a Bluetooth protocol being used requires less frequent Bluetooth data transmissions between devices than a previously used Bluetooth profile and/or Bluetooth protocol. For example, Bluetooth transmissions being a gaming device (e.g., a content streaming device that provides gaming functionality) and a gaming controller may occur more frequently than Bluetooth transmissions between a content streaming device and a remote control device. Accordingly, if a different Bluetooth profile and/or Bluetooth protocol will be used for a future Bluetooth timeslot than what was used for a most recent Bluetooth timeslot (or some other previous Bluetooth timeslot), and the different Bluetooth profile and/or Bluetooth protocol requires less frequent Bluetooth communication between devices, the AFACD module(s) may increase $T_{PERIOD}$. It should be appreciated that a change in Bluetooth activity may also cause a decrease in $T_{PERIOD}$ or no change in $T_{PERIOD}$.

As previously noted, a timeslot within $T_{PERIOD}$ may be allocated for Bluetooth transmissions. A duration of the timeslot $T_{BT}$ allocated for Bluetooth transmission may also be dependent on the type of Bluetooth activity. That is, a change in a Bluetooth profile and/or a Bluetooth protocol being used may cause an increase, decrease, or no change in $T_{BT}$. In certain example embodiments, for a given Bluetooth profile and/or a given Bluetooth protocol, the AFACD module(s) may determine the corresponding $T_{PERIOD}$ and $T_{BT}$ based on a predetermined mapping of transmission time periods and Bluetooth timeslot allocations to Bluetooth profiles and Bluetooth protocols. This predetermined mapping may, in certain example embodiments, specify, for each Bluetooth profile and each Bluetooth protocol and/or any combination of Bluetooth profile(s) and Bluetooth protocol(s), a corresponding $T_{PERIOD}$ and $T_{BT}$. The corresponding $T_{PERIOD}$ and $T_{BT}$ may be a maximum transmission time period and a maximum Bluetooth timeslot duration, respectively, needed to ensure reliable Bluetooth data communication and minimize packet loss.

As previously noted, the AFACD module(s) may determine that $T_{PERIOD}$ should be increased based on a change in Bluetooth activity. Based on the change in Bluetooth activity, the AFACD module(s) may further determine that $T_{BT}$ should be increased, decreased, or remain unchanged. If $T_{PERIOD}$ is increased and $T_{BT}$ is decreased or remains unchanged, the duration of the timeslot available for WiFi transmission $T_{WIFI}$ increases based on the relationship: $T_{PERIOD}=T_{BT}+T_{WIFI}$. In fact, if $T_{PERIOD}$ is increased, $T_{WIFI}$ may also increase even if $T_{BT}$ also increases as long as the increase in $T_{PERIOD}$ is greater than the increase in $T_{BT}$. Further, in certain example embodiments, even if a change in Bluetooth activity results in no change in $T_{PERIOD}$, it may nonetheless result in a decrease in $T_{BT}$, in which case, $T_{WIFI}$ would increase. In addition, in certain example embodiments, even if there is no change in Bluetooth activity, a change in channel conditions or another transmission parameter may result in a change in $T_{BT}$ such as, for example, an increase or a decrease in $T_{BT}$.

By adaptively determining $T_{PERIOD}$ and $T_{BT}$ based on changes in Bluetooth activity, the AFACD module(s) may adaptively determine $T_{WIFI}$, and more specifically, may determine when more time is available for WiFi transmission (e.g., when $T_{WIFI}$ increases). If $T_{WIFI}$ increases, $T_{WIFI}-T_{OVER}$ may also increase since $T_{OVER}$ is based on latency delay and/or the amount of header data to be transmitted, which is unlikely to be affected by changes in $T_{WIFI}$. Further, based on the relationship described earlier, as $T_{WIFI}-T_{OVER}$ increases, $F_{AGG}$ increases, which means that a greater number of data frames (e.g., MSDUs) can be aggregated into a single PHY layer packet (e.g., a single PSDU). This, in turn, may result in longer WiFi packet lengths and better airtime utilization, and thus, higher WiFi throughput.

In certain example embodiments, Bluetooth data transmissions between devices may not require the entire $T_{BT}$. That is, certain Bluetooth transmissions may be completed in less than the total time ($T_{BT}$) allocated for such transmissions. Thus, in certain example embodiments of the disclosure, the AFACD module(s) may determine the actual amount of time used for Bluetooth transmissions ($T_{ACTUAL\_BT}$), and if $T_{ACTUAL\_BT}$ is less than $T_{BT}$, the remaining time available in the Bluetooth timeslot (e.g., $T_{BT}-T_{ACTUAL\_BT}$) may be allocated for WiFi transmissions.

That is, $T_{BT}-T_{ACTUAL\_BT}$ may be effectively added to $T_{WIFI}$, increasing $T_{WIFI}$, and thus, increasing $F_{AGG}$.

Further, in certain example embodiments, a forgetting factor may be used in calculating $F_{AGG}$. For example, the AFACD module(s) may calculate $F_{AGG}$ for a current transmission time period using the process described above. The AFACD module(s) may then aggregate the calculated $F_{AGG}$ with one or more $F_{AGG}$ values corresponding to previous transmission time periods to obtain a final $F_{AGG}$ for the current transmission time period. As an example, the AFACD module(s) may average the $F_{AGG}$ calculated for the current transmission time period with one or more $F_{AGG}$s calculated for one or more previous transmission time periods. As another example, the AFACD module(s) may choose the minimum $F_{AGG}$ for the X most recent transmission time periods as the $F_{AGG}$ for the current transmission time period.

In addition, in certain example embodiments, a change in Bluetooth activity and/or a change in a transmission parameter (e.g., channel conditions) may result in a decrease in $T_{PERIOD}$ and/or an increase in $T_{BT}$. This may, in turn, result in a decrease in $T_{WIFI}$, and consequently, a decrease in $F_{AGG}$. A decrease in $F_{AGG}$ may result in a lesser number of data frames (e.g., MSDUs) being aggregated into a single PHY layer packet (e.g., a single PSDU), thereby reducing payload packet length to allow the packet to be transmitted or received within $T_{WIFI}$. Using this mechanism, a device can adapt to new link conditions more quickly by switching away from larger $F_{AGG}$ values and longer packets that would not be able to be transmitted or received within $T_{WIFI}$. In certain example embodiments, $T_{WIFI}$ may be of such a short duration that even a single data frame (e.g., a single MSDU) cannot be contained within a PHY layer packet. In such example embodiments, rather than packet aggregation, packet segmentation may be employed to segment a data frame (e.g., an MSDU) across multiple PHY layer packets. That is, a single MSDU may be split into multiple PSDUs.

Example embodiments of the disclosure provide a number of technical features, technical effects, and improvements to technology. For example, in accordance with example embodiments of the disclosure, a periodicity (e.g., a duration of a transmission time period for transmitting first data in accordance with a first wireless communication standard and transmitting second data in accordance with a second wireless communication standard) and a duration of a timeslot within the transmission time period that is allocated for transmitting the first data in accordance with the first wireless communication standard may be adaptively determined based on changes in the type of data transmission activity associated with the first wireless communication standard (e.g., a change in a profile or protocol of the first wireless communication standard). This, in turn, allows for adaptively determining the time available for transmitting the second data using the second wireless communication standard, and thus, adaptively determining a frame aggregation count that specifies how many data frames can be aggregated into a single data packet. Thus, example embodiments of the disclosure provide the capability to adaptively determine when more time is available for transmitting the second data using the second wireless communication standard and increase the number of data frames that are aggregated into a data packet which, in turn, provides the technical effect of increasing packet length and data throughput. Further, example embodiments of the disclosure also provide the capability to adaptively determine when less time is available for transmitting the second data using the second wireless communication standard and decrease the number of data frames included in a single data packet, potentially to a point where a data frame is segmented across multiple data packets. The adaptive determination of timeslot duration for transmitting data using a particular wireless communication standard and the resulting adjustments to packet aggregation or segmentation yield improvements to existing wireless transmission technologies. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiments

FIG. 1 schematically depicts a high level overview of a process for adaptively determining a frame aggregation count for a WiFi protocol based on a change in the type of Bluetooth activity and/or a change in the amount of Bluetooth data traffic in accordance with one or more example embodiments of the disclosure.

A wireless device 100 is illustratively depicted in FIG. 1. The wireless device 100 may be a smartphone, a tablet, a personal computer, a laptop computer, a content streaming device, a wearable computing device, or the like. The wireless device 100 may include any device capable of transmitting/receiving data using at least two different wireless communication standards such as, for example, the Bluetooth wireless communication standard and a WiFi protocol of the 802.11 family of wireless communication standards.

In the example embodiments in which the wireless device 100 is capable of transmitting/receiving data in accordance with the Bluetooth wireless communication standard and a WiFi wireless communication standard, the device may include a Bluetooth antenna 102, a Bluetooth radio 104, and a Bluetooth controller 106. The device 100 may further include a WiFi antenna 110, a WiFi radio 112, and a WiFi controller 114. It should be appreciated that Bluetooth and WiFi are merely example wireless communication standards that may be utilized in various example embodiments of the disclosure. Other example embodiments of the disclosure may utilize other wireless communication standards in lieu of, or in addition to, Bluetooth such as, for example, any of the 802.15.4 set of wireless communication standards. Similarly, other example embodiments of the disclosure may utilize other wireless communication standards in lieu of, or in addition to, WiFi such as, for example, any other wireless communication standard that utilizes a frame aggregation parameter to determine the number of data frames to aggregate into a data packet.

At the direction of the Bluetooth controller 106, the Bluetooth radio 104 may provide both signal transmission and signal reception capabilities. For example, during transmission, the Bluetooth radio 104 may supply an electric current oscillating at a radio frequency in which Bluetooth operates (e.g., the 2.4 GHz band) to the Bluetooth antenna 102 which may, in turn, radiate the energy from the current in the form of electromagnetic waves (e.g., radio waves).

During reception, the antenna 102 may intercept some power of a radio wave in order to produce a voltage at one or more terminals of the antenna 102, and the voltage may be applied to the Bluetooth radio 104 for amplification.

Similarly, at the direction of the WiFi controller 114, the WiFi radio 112 may provide both signal transmission and signal reception capabilities. For example, during transmission, the WiFi radio 112 may supply an electric current oscillating at a radio frequency in which WiFi operates (e.g., the 2.4 GHz band for certain WiFi protocols) to the WiFi antenna 110 which may, in turn, radiate the energy from the current in the form of electromagnetic waves (e.g., radio waves). During reception, the antenna 110 may intercept some power of a radio wave in order to produce a voltage at one or more terminals of the antenna 110, and the voltage may be applied to the WiFi radio 104 for amplification.

In certain example embodiments, the Bluetooth radio 104 and the WiFi radio 112 (and their corresponding antennas 102, 110) may be provided as part of a wireless chip such as, for example, an integrated circuit (IC) chip. Although both a Bluetooth antenna 102 and a WiFi antenna 110 are depicted in FIG. 1, in certain example embodiments, the wireless chip may include a single shared antenna that provides signal transmission/reception capabilities for both Bluetooth and WiFi. In those example embodiments in which a single shared antenna is provided, the wireless chip may include a switch for switching between the Bluetooth radio 104 and the WiFi radio 112, and thus, for switching between Bluetooth and WiFi transmission/reception via the shared antenna. Further, in certain example embodiments, the wireless chip may include a coexistence engine that provides control signals to the switch to enable the switching between Bluetooth and WiFi. The coexistence engine may also be configured to signal the Bluetooth controller 106 when the Bluetooth radio 104 is active and signal the WiFi radio 112 when the WiFi radio 112 is active. In certain example embodiments, the coexistence engine may be a separate hardware component of the wireless chip. In other example embodiments, the coexistence engine may be implemented in firmware and/or software accessible by a microcontroller of the wireless chip.

The wireless device 100 may further include one or more adaptive frame aggregation count determination (AFACD) module(s) 118. The AFACD module(s) 118 may be implemented in any combination of hardware, software, and/or firmware. In certain example embodiments, the AFACD module(s) 118 may form part of the coexistence engine described earlier. The AFACD module(s) 118 may be configured to receive one or more input parameters 108 from the Bluetooth controller 106. The input parameters 108 may indicate, for example, a type of Bluetooth activity and an amount of Bluetooth data traffic. As previously described, the type of Bluetooth activity may include one or more Bluetooth profiles and one or more Bluetooth protocols that are being used for Bluetooth data transmissions. In certain example embodiments, the Bluetooth controller 106 may be configured to periodically send the input parameters 108 to the AFACD module(s) 118. In other example embodiments, the Bluetooth controller 106 may only send certain input parameters 108 to the AFACD module(s) 118 when a change occurs in the input parameters. For example, the Bluetooth controller 106 may only send an indication of the type of Bluetooth activity to the AFACD module(s) 118 when a change occurs in the type of Bluetooth activity such as a change in a Bluetooth profile being used and/or a change in a Bluetooth protocol being used. In yet other example embodiments, the AFACD module(s) 118 may periodically poll the Bluetooth controller 106 for the input parameters 108. In certain example embodiments, the AFACD module(s) 118 may receive the input parameters 108 via the coexistence engine.

Upon receiving the input parameters 108, computer-executable instructions of the AFACD module(s) 118 may be executed to determine a periodicity of Bluetooth transmissions based on the type of Bluetooth activity. As previously noted, different Bluetooth profiles may require different periodicities of Bluetooth transmissions. For example, if the device 100 is using the HID profile to communicate with a peripheral device, such as a game controller, the device 100 and the game controller may need to communicate more frequently than would be the case if the device 100 was using a different Bluetooth profile to communicate with a different peripheral device such as a remote control device. Similarly, different Bluetooth protocols may be associated with different periodicities.

The periodicity of Bluetooth transmissions may define a total transmission time period ($T_{PERIOD}$) for transmitting first data using Bluetooth and for transmitting second data using a protocol associated with a different wireless communication standard (a WiFi protocol). If the input parameters 108 indicate a change in Bluetooth activity that is associated with a different periodicity of Bluetooth transmissions, the AFACD module(s) 118 may determine that $T_{PERIOD}$ should be increased, decreased, or remain unchanged. In addition, computer-executable instructions of the AFACD module(s) 118 may be executed to determine a duration of a timeslot $T_{BT}$ within $T_{PERIOD}$ that is allocated for Bluetooth transmission. As with $T_{PERIOD}$, $T_{BT}$ may also be dependent on the type of Bluetooth activity. That is, a change in a Bluetooth profile and/or a Bluetooth protocol being used may cause an increase, decrease, or no change in $T_{BT}$. Further, even in the absence of a change in Bluetooth activity, $T_{BT}$ may nonetheless change as a result of changes in one or more transmission parameters such as, for example, changes in channel conditions.

In certain example embodiments, for a given Bluetooth profile and/or a given Bluetooth protocol, the AFACD module(s) 118 may determine the corresponding $T_{PERIOD}$ and $T_{BT}$ based on a predetermined mapping of transmission time periods and Bluetooth timeslot allocations to Bluetooth profiles and Bluetooth protocols. This predetermined mapping may, in certain example embodiments, specify, for each Bluetooth profile and each Bluetooth protocol and/or any combination of Bluetooth profile(s) and Bluetooth protocol(s), a corresponding $T_{PERIOD}$ and $T_{BT}$. The corresponding $T_{PERIOD}$ and $T_{BT}$ may be a maximum transmission time period and a maximum Bluetooth timeslot duration, respectively, needed to ensure reliable Bluetooth data communication and minimize packet loss.

In certain example embodiments, the AFACD module(s) 118 may determine that $T_{PERIOD}$ should be increased based on a change in Bluetooth activity as indicated by the input parameters 108. For example, if a Bluetooth profile and/or a Bluetooth protocol being used requires less frequent Bluetooth data transmissions between devices than a previously used Bluetooth profile and/or Bluetooth protocol, the AFACD module(s) 118 may determine that $T_{PERIOD}$ should be increased. Accordingly, if a different Bluetooth profile and/or Bluetooth protocol will be used for a future Bluetooth timeslot than what was used for a most recent Bluetooth timeslot (or some other previous Bluetooth timeslot), and the different Bluetooth profile and/or Bluetooth protocol requires less frequent Bluetooth communication between devices, the AFACD module(s) 118 may increase $T_{PERIOD}$.

It should be appreciated that a change in Bluetooth activity may also cause a decrease in $T_{PERIOD}$ or no change in $T_{PERIOD}$. In addition, based on the change in Bluetooth activity, the AFACD module(s) 118 may further determine that $T_{BT}$ should be increased, decreased, or remain unchanged.

Computer-executable instructions of the AFACD module(s) 118 may then be executed to utilize the total transmission time period $T_{PERIOD}$ and the duration $T_{BT}$ of timeslots allocated for Bluetooth transmissions to determine the duration $T_{WIFI}$ of timeslots available for transmitting data using a WiFi protocol. More specifically, computer-executable instructions of the AFACD module(s) 118 may be executed to determine $T_{WIFI}$ based on the following relationship: $T_{PERIOD} = T_{BT} + T_{WIFI}$. The AFACD module(s) 118 may then determine the frame aggregation count $F_{AGG}$ using $T_{WIFI}$ and various other parameters.

As previously noted, the various other parameters that may impact the determination of $F_{AGG}$ for data transmissions that use, for example, a WiFi protocol may include, without limitation, $DR_{WIFI}$, $T_{OVER}$, and $F_{SIZE}$. $DR_{WIFI}$ may be a measure of the amount of data transmitted using a WiFi protocol divided by the amount of time required to transmit the data (e.g., Mbps). $DR_{WIFI}$ may be a function of one or more conditions associated with a WiFi channel. For example, an increase in the signal-to-noise (SNR) for a WiFi channel may lead to an increase in $DR_{WIFI}$. In certain example embodiments, the wireless device 100 may be configured to directly measure $DR_{WIFI}$ such as, for example, in transmission scenarios. In other example embodiments, the wireless device 100 may receive an indication of $DR_{WIFI}$ from a WiFi access point such as, for example, in reception scenarios. $T_{OVER}$ may be the amount of time needed to transmit non-payload data such as, for example, header data. Header data may include a frame control field, a sequence number, source and destination addresses, and so forth. $T_{OVER}$ may also include latency time associated with switching from Bluetooth transmission to WiFi transmission.

In certain example embodiments, the AFACD module(s) 118 may determine $F_{AGG}$ based on the following relationship: $F_{AGG} = (T_{WIFI} - T_{OVER}) * DR_{WIFI} / F_{SIZE}$. As previously noted, $T_{WIFI}$ may be equal to $T_{PERIOD} - T_{BT}$, and thus, may represent the duration of a timeslot available for WiFi transmission within a transmission time period that also includes a timeslot allocated for Bluetooth transmission. $T_{WIFI} - T_{OVER}$ may represent the amount of time actually available for WiFi transmission after taking into account any time delay associated with switching from Bluetooth transmission to WiFi transmission and/or time required to transmit header data. As previously noted, for a given $T_{WIFI} - T_{OVER}$, as $DR_{WIFI}$ increases, $F_{AGG}$ may also increase, and as $DR_{WIFI}$ decreases, $F_{AGG}$ may also decrease. In addition, for a given $DR_{WIFI}$, as $T_{WIFI} - T_{OVER}$ increases, $F_{AGG}$ may also increase, and as $T_{WIFI} - T_{OVER}$ decreases, $F_{AGG}$ may also decrease. In certain example embodiments, a weighting factor may be applied to the expression above to yield $F_{AGG}$.

Upon determining $F_{AGG}$, computer-executable instructions of the AFACD module(s) 118 may be executed to cause one or more output parameters 116 to be sent to the WiFi controller 114. In certain example embodiments, the AFACD module(s) 118 may send the output parameter(s) 116 to the WiFi controller 114 via the coexistence engine. The output parameters 116 may include the value of $F_{AGG}$, and optionally, may further include one or more additional parameters such as $T_{PERIOD}$, $T_{BT}$, and/or $T_{WIFI}$. The WiFi controller 114 may utilize the value of $F_{AGG}$ to determine the number of data frames (e.g., MSDUs) to aggregate into a single PHY layer WiFi packet (e.g., a single PSDU) transmitted via the WiFi radio 112 and the WiFi antenna 110. In addition, the WiFi controller 114 may also cause the $F_{AGG}$ value to be sent via the WiFi radio 112 and the WiFi antenna 110 to a WiFi access point (not shown in FIG. 1). The WiFi access point may then use the $F_{AGG}$ value that is received to determine a number of data frames (e.g., MSDUs) to aggregate into a single PHY layer packet (e.g., a single PSDU). In certain example embodiments, such as those in which a shared antenna is used to transmit Bluetooth and WiFi, the coexistence engine may control the switch to switch between activation of the Bluetooth radio 104 and activation of the WiFi radio 112 based on the respective timeslot allocation durations $T_{BT}$ and $T_{WIFI}$ determined by the AFACD module(s) 118 in accordance with example embodiments of the disclosure.

The right side of FIG. 1 depicts different example transmission time periods and different timeslot allocations for Bluetooth and WiFi transmissions. As shown, for a first transmission time period 120 $T_{PERIOD\_1}$, a first timeslot may be allocated for Bluetooth transmission and a second timeslot may be allocated for WiFi transmission. The terms first and second may be used herein to indicate different components, entities, or the like and do not necessarily indicate any particular order. As an example, the first timeslot allocated to Bluetooth transmissions may be 5 ms in duration and the second timeslot available for WiFi transmission may be 2 ms in duration. The first and second timeslots may be repeated with a periodicity corresponding to $T_{PERIOD\_1}$ any number of times.

As previously discussed, the AFACD module(s) 118 may receive input parameters 108 that may indicate a change in Bluetooth activity such as a change in a Bluetooth profile being used for Bluetooth transmission and/or a change in a Bluetooth protocol being used for Bluetooth transmission. Based on the change in the Bluetooth activity, the AFACD module(s) 118 may determine that $T_{PERIOD\_1}$ should be increased. An increase in $T_{PERIOD\_1}$ to a second transmission time period 122 $T_{PERIOD\_2}$ having a longer duration is illustratively shown in FIG. 1. For example, $T_{PERIOD\_1}$, which may have a duration of 7 ms, may be increased to $T_{PERIOD\_2}$ having a duration of 9 ms. This increase in the duration of the transmission time period (the increase in $T_{PERIOD\_1}$ to $T_{PERIOD\_2}$) may provide additional time for WiFi transmission. As previously discussed, this additional available time may result in a greater $F_{AGG}$ value, and thus, longer WiFi data packets and higher throughput.

More specifically, as previously described, the duration of the timeslot available for WiFi transmission $T_{WIFI}$ may be determined by the relationship: $T_{PERIOD} = T_{BT} + T_{WIFI}$. Further, as previously described, the frame aggregation count $F_{AGG}$ may be determined based on the following relationship: $F_{AGG} = (T_{WIFI} - T_{OVER}) * DR_{WIFI} / F_{SIZE}$. Thus, if $T_{WIFI}$ increases, $T_{WIFI} - T_{OVER}$ may also increase since $T_{OVER}$ is based on latency delay and/or the amount of header data to be transmitted, which is unlikely to be affected by changes in $T_{WIFI}$. Further, as $T_{WIFI} - T_{OVER}$ increases, $F_{AGG}$ increases, which means that a greater number of data frames (e.g., MSDUs) can be aggregated into a single PHY layer packet (e.g., a single PSDU). This, in turn, may result in longer WiFi packet lengths, and thus, higher WiFi throughput.

In certain example embodiments, even though the change in Bluetooth activity results in a longer period $T_{PERIOD\_2}$, the duration of the timeslot $T_{BT}$ allocated for Bluetooth transmission may remain unchanged, as illustratively shown in FIG. 1. Thus, if $T_{PERIOD}$ increases, such as from $T_{PERIOD\_1}$ to $T_{PERIOD\_2}$, and $T_{BT}$ remains unchanged, $T_{WIFI}$ will increase based on the relationship: $T_{PERIOD}=T_{BT}+T_{WIFI}$. The increase in $T_{WIFI}$ may result in an increase in the value of $F_{AGG}$ which, in turn, allows for greater frame aggregation and greater data throughput. Further, if the change in Bluetooth activity also results in a decrease in $T_{BT}$, $T_{WIFI}$ may increase by an even larger amount, resulting in an even larger $F_{AGG}$ value, and thus, allowing for even greater frame aggregation and an even greater data throughput. Moreover, if $T_{PERIOD}$ is increased from $T_{PERIOD\_1}$ to $T_{PERIOD\_2}$, $T_{WIFI}$ may still increase even if $T_{BT}$ also increases as long as the increase in $T_{PERIOD}$ is greater than the increase in $T_{BT}$.

Further, in certain example embodiments, the AFACD module(s) 118 may determine that $T_{BT}$ should be decreased based on a change in Bluetooth activity even if the change in Bluetooth activity does not result in a change to $T_{PERIOD}$. For example, notwithstanding a change in Bluetooth activity, $T_{PERIOD\_2}$ may be the same duration (e.g., 9 ms) as a duration of a third transmission time period 124 $T_{PERIOD\_3}$. The change in Bluetooth activity may, however, result in a decrease in $T_{BT}$ (e.g., from 5 ms to 2 ms), which would make more time in the third transmission time period $T_{PERIOD\_3}$ available for WiFi data transmission (e.g., increase $T_{WIFI}$). Further, in certain example embodiments, even if no change in Bluetooth activity occurs, the duration $T_{BT}$ of the timeslot allocated for Bluetooth transmission may nonetheless decrease as a result of a change in another transmission parameter such as, for example, a change in channel conditions.

In addition, in certain example embodiments, Bluetooth data transmissions between devices may not require the entire $T_{BT}$. That is, certain Bluetooth transmissions may be completed in less than the total time ($T_{BT}$) allocated for such transmissions. Thus, in certain example embodiments of the disclosure, the AFACD module(s) 118 may determine the actual amount of time used for Bluetooth transmissions ($T_{ACTUAL\_BT}$), and if $T_{ACTUAL\_BT}$ is less than $T_{BT}$, the remaining time available in the Bluetooth timeslot (e.g., $T_{BT}-T_{ACTUAL\_BT}$) may be allocated for WiFi transmissions. That is, regardless of whether $T_{PERIOD}$ changes, if $T_{ACTUAL\_BT}$ is less than $T_{BT}$, then $T_{BT}-T_{ACTUAL\_BT}$ may be effectively added to $T_{WIFI}$, increasing $T_{WIFI}$, and thus, increasing $F_{AGG}$.

Further, in certain example embodiments, a forgetting factor may be used in calculating $F_{AGG}$. For example, the AFACD module(s) 118 may calculate $F_{AGG}$ for a current transmission time period (e.g., $T_{PERIOD\_3}$) using the process described above. The AFACD module(s) 118 may then aggregate the calculated $F_{AGG}$ with one or more $F_{AGG}$ values corresponding to previous transmission time periods to obtain a final $F_{AGG}$ for the current transmission time period. As an example, the AFACD module(s) 118 may average the $F_{AGG}$ calculated for the current transmission time period (e.g., $T_{PERIOD\_3}$) with one or more $F_{AGG}$s calculated for one or more previous transmission time periods (e.g., $T_{PERIOD\_2}$ and/or $T_{PERIOD\_3}$). As another example, the AFACD module(s) 118 may choose the minimum $F_{AGG}$ for the X most recent transmission time periods as the $F_{AGG}$ for the current transmission time period.

In addition, in certain example embodiments, a change in Bluetooth activity and/or a change in some other transmission parameter (e.g., channel conditions) may result in a decrease in $T_{PERIOD}$ and/or an increase in $T_{BT}$. For example, a change in Bluetooth activity and/or a change in a transmission parameter may result in an increase in the transmission time period from $T_{PERIOD\_3}$ to $T_{PERIOD\_1}$ and an increase in the Bluetooth timeslot allocation from 2 ms to 5 ms, as illustratively shown in FIG. 1. This may, in turn, result in a decrease in $T_{WIFI}$ from 7 ms to 2 ms, and consequently, a decrease in $F_{AGG}$. A decrease in $F_{AGG}$ may result in a lesser number of data frames (e.g., MSDUs) being aggregated into a single PHY layer packet (e.g., a single PSDU), thereby reducing packet length and decreasing throughput. In certain example embodiments, $T_{WIFI}$ may be of such a short duration that even a single data frame (e.g., a single MSDU) cannot be contained within a PHY layer packet. In such example embodiments, rather than packet aggregation, packet segmentation may be employed to segment a data frame (e.g., an MSDU) across multiple PHY layer packets. That is, a single MSDU may be split into multiple PSDUs.

Figure 2:
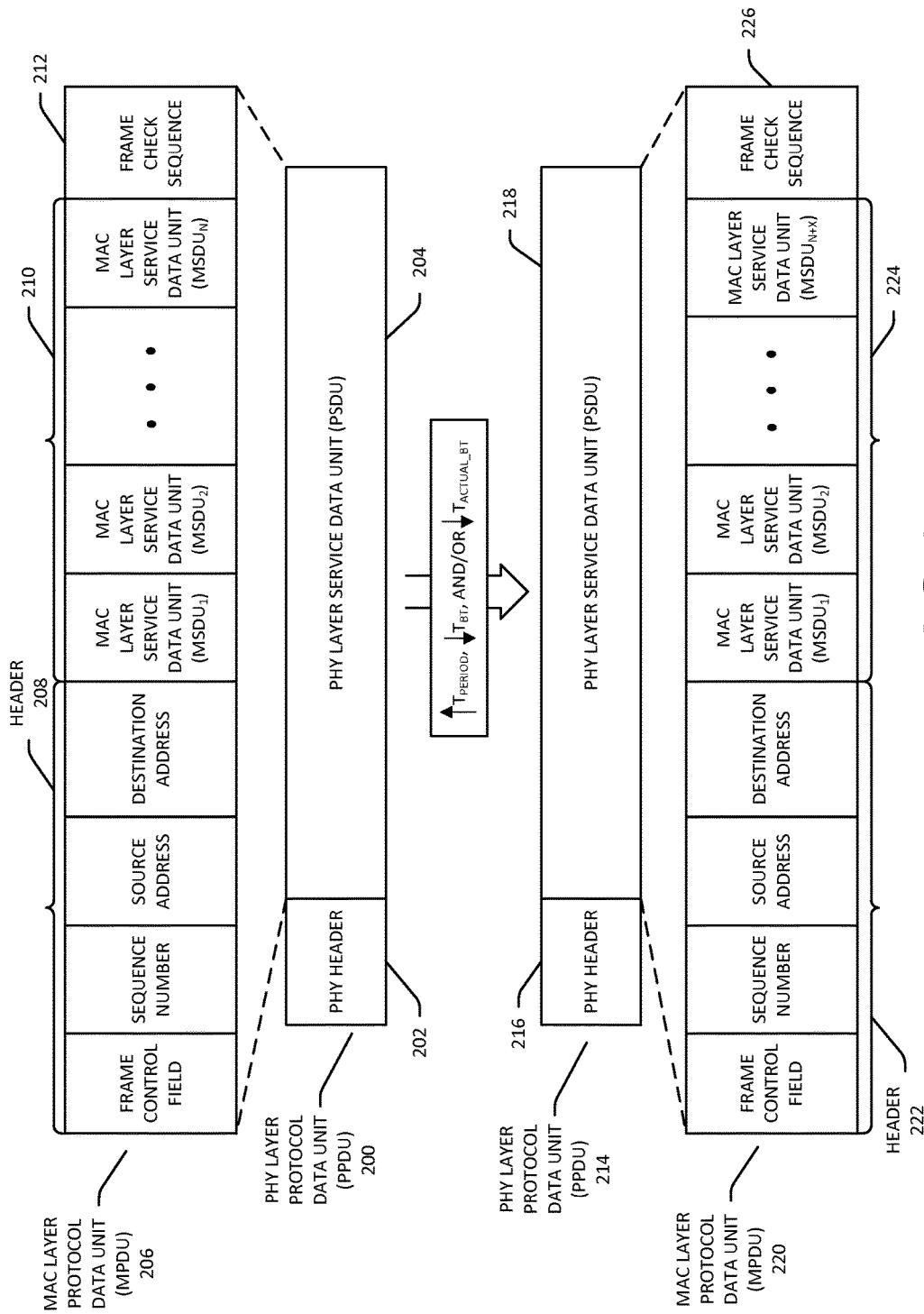
FIG. 2 schematically depicts the aggregation of a greater number of Media Access Control (MAC) layer service data units (MSDUs) into a single physical layer service data unit (PSDU) based on an increase in the periodicity of Bluetooth transmissions, a decrease in a duration of timeslots allocated for Bluetooth transmissions, and/or a duration of Bluetooth data transmissions during an allocated timeslot being less than a duration of the allocated timeslot in accordance with one or more example embodiments of the disclosure.

FIG. 2 schematically depicts the aggregation of a greater number of Media Access Control (MAC) layer service data units (MSDUs) into a single physical layer service data unit (PSDU) based on an increase in the periodicity of Bluetooth transmissions, a decrease in a duration of timeslots allocated for Bluetooth transmissions, and/or a duration of Bluetooth data transmissions during an allocated timeslot being less than a duration of the allocated timeslot in accordance with one or more example embodiments of the disclosure.

As previously described, a frame aggregation count may denote the number of data frames at a first network layer that can be aggregated into a single data packet at a second network layer that may be at a lower level in a network layer hierarchy than the first network layer. In certain example embodiments of the disclosure, the frame aggregation count for a WiFi protocol may indicate the number of MSDUs that can be aggregated into a single physical (PHY) layer packet.

A PHY layer packet may be referred to as a PHY layer protocol data unit (PPDU). An example PPDU 200 is shown in FIG. 2. The PPDU 200 may include header data 202 and a PHY layer service data unit (PSDU) 204. The PSDU 204 at the physical layer may correspond to a MAC layer protocol data unit (MPDU) 206 at the MAC sub-layer. The MPDU 206 may include a header 208. The header may include, without limitation, a frame control field, a sequence number, and addressing data such as, for example, a source address indicating a source of the MPDU 206 and a destination address indicating an intended destination for the MPDU 206. The MPDU 206 may also include a frame check sequence 212 for error detection. The MPDU 206 may also include one or more MAC layer service data units (MSDUs) 210. The number of MSDUs 210 aggregated into the MPDU 206 may be determined based on the frame aggregation count $F_{AGG}$ which, as described earlier, may be determined according to the relationship: $F_{AGG}=(T_{WIFI}-T_{OVER})*DR_{WIFI}/F_{SIZE}$.

As described earlier, a change in Bluetooth activity may result in an increase in a transmission time period $T_{PERIOD}$ and/or a reduction in the duration of a timeslot $T_{BT}$ allocated for Bluetooth transmission. Additionally, or alternatively, some portion of a timeslot allocated for Bluetooth transmissions may be unused. That is, $T_{ACTUAL\_BT}$ may be less than $T_{BT}$. In any of these scenarios, the time available for WiFi transmission $T_{WIFI}$ may increase which, in turn, may result in an increase in $F_{AGG}$, thereby allowing more MSDUs to be aggregated into a single PSDU.

This is illustratively shown in FIG. 2. Another example PPDU 214 is shown in FIG. 2. The PPDU 214 may include header data 216 and a PSDU 218. The PSDU 218 at the physical layer may correspond to an MPDU 220 at the MAC sub-layer. The MPDU 220 may include a header 222 which may include, without limitation, a frame control field, a sequence number, and addressing data such as, for example, a source address and a destination address. The MPDU 220 may also include a frame check sequence 226 for error detection. The MPDU 220 may also include MSDUs 224.

If $T_{PERIOD}$ increases, $T_{BT}$ decreases, and/or $T_{ACTUAL\_BT}$ is less than $T_{BT}$, $T_{WIFI}$ may increase which, in turn, may result in an increase in $F_{AGG}$, thereby allowing more MSDUs 224 to be aggregated into a single PSDU 218 than the MSDUs 210 aggregated into the PSDU 204. More specifically, N+X MSDUs 224 are depicted as being aggregated into the PSDU 218 while N MSDUs 210 are depicted as being aggregated into the PSDU 204. N may be an integer value greater than or equal to one and X may be an integer value greater than N. As the frame aggregation count increases, a greater number of MSDUs (N+X instead of N) can be aggregated into a single PHY layer packet, thereby resulting in longer packets. Longer packets contain a greater number of bits in the payload. Longer packets thus result in greater throughput at higher network layers in the network hierarchy.

Illustrative Processes

Figure 3:
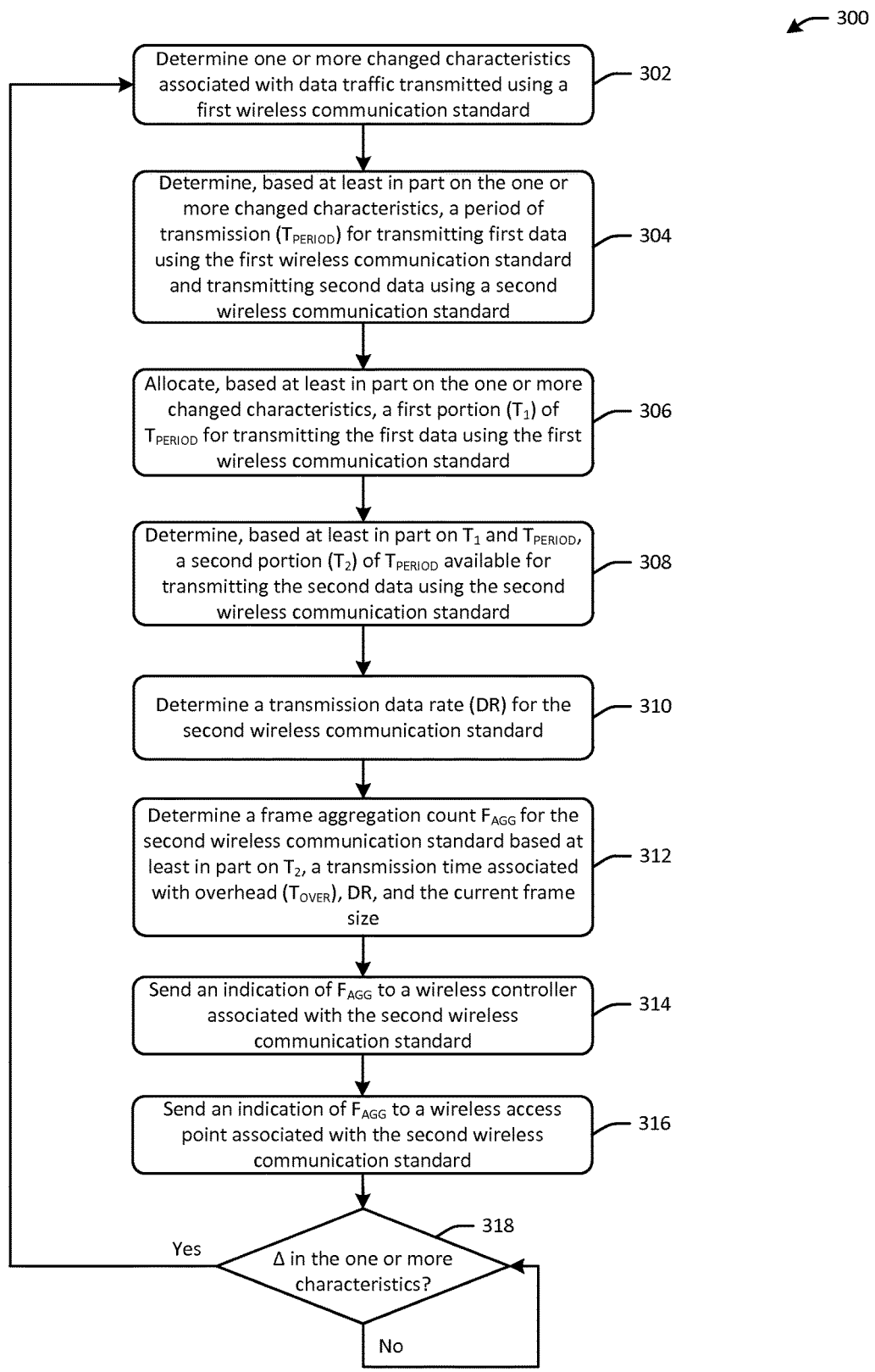
FIG. 3 is a process flow diagram of an illustrative method for determining one or more characteristics associated with data traffic transmitted using a first wireless communication standard, determining a transmission time period for transmitting first data using the first wireless communication standard and second data using a second wireless communication standard, allocating a first timeslot of the transmission time period for transmitting the first data, determining a duration of a second timeslot of the transmission time period available for transmitting the second data, and determining a frame aggregation count for the second wireless communication standard based at least in part on the duration of the second timeslot in accordance with one or more embodiments of the disclosure.

FIG. 3 is a process flow diagram of an illustrative method 300 for determining one or more characteristics associated with data traffic transmitted using a first wireless communication standard, determining a transmission time period for transmitting first data using the first wireless communication standard and second data using a second wireless communication standard, allocating a first timeslot of the transmission time period for transmitting the first data, determining a duration of a second timeslot of the transmission time period available for transmitting the second data, and determining a frame aggregation count for the second wireless communication standard based at least in part on the duration of the second timeslot in accordance with one or more embodiments of the disclosure.

At block 302, computer-executable instructions of the AFACD module(s) 118 may be executed to determine change(s) to one or more characteristics associated with data traffic transmitted using a first wireless communication standard. In certain example embodiments of the disclosure, the one or more characteristics may be a wireless profile and/or a wireless protocol being used to transmit the data traffic transmitted using the first wireless communication standard. Accordingly, the change(s) to the one or more characteristics may be a change in a wireless profile being used and/or a change in a wireless protocol being used. The first wireless communication standard may be, for example, the Bluetooth standard. As described earlier, the Bluetooth standard includes a number of Bluetooth profiles and a number of Bluetooth protocols. As such, the changed characteristic(s) may be a change in the Bluetooth profile being used and/or a change in the Bluetooth protocol being used. In certain example embodiments, the first wireless communication standard may be another wireless communication standard other than Bluetooth such as, for example, any of the IEEE 802.15.4 family of wireless communication standards.

At block 304, computer-executable instructions of the AFACD module(s) 118 may be executed to determine, based at least in part on the changed characteristic(s), a period of transmission $T_{PERIOD}$ for transmitting first data using the first wireless communication standard and second data using the second wireless communication standard. The second wireless communication standard may be, for example, a WiFi protocol. As previously noted, the changed characteristic(s) may be the use of a different wireless profile and/or the use of a different wireless protocol in connection with the first wireless communication standard. Different wireless profiles may require different periodicities of transmission. For example, if a wireless profile requires more frequent communication between devices, a smaller periodicity may be required. Conversely, if a wireless profile requires less frequent communication between devices, a greater periodicity may be acceptable. Similarly, different wireless protocols may be associated with different periodicities.

The periodicity of transmissions using the first wireless communication standard may define the total transmission time period $T_{PERIOD}$ needed to transmit the first data using the first wireless communication standard and the second data using the second wireless communication standard. Based on the changed characteristic(s), the AFACD module(s) 118 may determine that $T_{PERIOD}$ should be increased, decreased, or remain unchanged from a previous transmission period.

At block 306, computer-executable instructions of the AFACD module(s) 118 may be executed to allocate a first portion $T_1$ of $T_{PERIOD}$ for transmitting the first data using the first wireless communication standard. As with $T_{PERIOD}$, $T_1$ may also be dependent on the changed characteristic(s). That is, a change in a wireless profile and/or a wireless protocol being used in connection with the first wireless communication standard may cause an increase, decrease, or no change in the duration of time $T_1$ as compared to a previous transmission period.

At block 308, computer-executable instructions of the AFACD module(s) 118 may be executed to determine, using the total transmission time period $T_{PERIOD}$ and the duration $T_1$ of timeslots allocated for transmission of the first data using the first wireless communication standard, the duration $T_2$ of timeslots available for transmitting the second data using the second wireless communication standard. More specifically, computer-executable instructions of the AFACD module(s) 118 may be executed to determine $T_2$ based on the following relationship: $T_{PERIOD}=T_1+T_2$. If the first wireless communication standard is Bluetooth and the second wireless communication standard is a WiFi protocol, the relationship becomes $T_{PERIOD}=T_{BT}+T_{WIFI}$.

At block 310, computer-executable instructions of the AFACD module(s) 118 may be executed to determine a transmission data rate (DR) for the second wireless communication standard. In certain example embodiments, such as in transmission scenarios in which the wireless device 100 is uploading data, computer-executable instructions of the AFACD module(s) 118 may be executed to determine DR based at least in part on one or more channel conditions. An example channel condition may be the SNR ratio for a channel. In other example embodiments, such as in reception scenarios in which the wireless device 100 is downloading data, the AFACD module(s) 118 may receive, from a wireless access point, an indication of a DR being used by the access point and may utilize that DR at block 310.

At block 312, computer-executable instructions of the AFACD module(s) 118 may then be executed to determine a frame aggregation count $F_{AGG}$ for the second wireless communication standard using $T_2$, DR, a transmission time associated with overhead $T_{OVER}$, and the current frame size ($F_{SIZE}$). $T_{OVER}$ may be the amount of time needed to transmit non-payload data such as, for example, header data. Header data may include a frame control field, a sequence number, source and destination addresses, and so forth. $T_{OVER}$ may also include latency time associated with switching from the first wireless communication standard to the second wireless communication standard.

More specifically, in certain example embodiments, computer-executable instructions of the AFACD module(s) 118 may be executed to determine $F_{AGG}$ based on the following relationship: $F_{AGG}=(T_2-T_{OVER})*DR/F_{SIZE}$. As previously noted, $T_2$ may be equal to $T_{PERIOD}-T_1$, and thus, may represent the duration of a timeslot available for transmissions that use the second wireless communication standard within a transmission time period that also includes a timeslot allocated for transmissions that use the first wireless communication standard. $T_2-T_{OVER}$ may represent the amount of time actually available for transmissions using the second wireless communication standard after taking into account any time delay associated with switching from the first wireless communication standard to the second wireless communication standard and/or time required to transmit header data. In certain example embodiments, a weighting factor may be applied to the expression above to yield $F_{AGG}$.

Upon determining $F_{AGG}$, computer-executable instructions of the AFACD module(s) 118 may be executed at block 314 to send the determined value of $F_{AGG}$, and optionally, additional parameters such as $T_{PERIOD}$, $T_1$, and/or $T_2$ to a wireless controller associated with the second wireless communication standard, thereby enabling a number of data frames (e.g., MSDUs) corresponding to the value of $F_{AGG}$ to be aggregated into a single PHY layer packet (e.g., a single PSDU).

At block 316, computer-executable instructions of the AFACD module(s) 118 may be executed to send an indication of $F_{AGG}$ to a wireless access point associated with the second wireless communication standard. The wireless access point may then optionally use the $F_{AGG}$ value to determine a number of data frames to aggregate into data packets sent to the wireless device 100.

As previously discussed, the AFACD module(s) 118 may determine that $T_{PERIOD}$ should be increased from a previous value of $T_{PERIOD}$ based on one or more changes to characteristic(s) associated with the first wireless communication standard. An increase in $T_{PERIOD}$ (e.g., an increase in the duration of the transmission time period) may result in an increase in $T_2$ by virtue of the relationship: $T_{PERIOD}=T_1+T_2$. Thus, more time may be available for transmitting data using the second wireless communication standard which, in turn, may result in a greater $F_{AGG}$ value. A greater $F_{AGG}$ value may result in longer WiFi data packets and higher throughput.

In certain example embodiments, even though changed characteristics associated with the first wireless communication standard may result in a longer transmission time period $T_{PERIOD}$, the duration of the timeslot $T_1$ allocated for data transmissions that use the first wireless communication standard may remain unchanged. Thus, if $T_{PERIOD}$ increases and $T_1$ remains unchanged, $T_2$ will increase based on the relationship: $T_{PERIOD}=T_1+T_2$. The increase in $T_2$ may result in an increase in the value of $F_{AGG}$ which, in turn, allows for greater frame aggregation and greater data throughput. Further, if the changed characteristics also result in a decrease in $T_1$, $T_2$ may increase by an even larger amount, resulting in an even larger $F_{AGG}$ value, and thus, allowing for even greater frame aggregation and an even greater data throughput. Moreover, if $T_{PERIOD}$ is increased, $T_2$ may still increase even if $T_1$ also increases as long as the increase in $T_{PERIOD}$ is greater than the increase in $T_1$.

Further, in certain example embodiments, the AFACD module(s) 118 may determine that $T_2$ should be increased based on the changed characteristic(s) even if the changed characteristic(s) do not result in a change to $T_{PERIOD}$. For example, notwithstanding a change in the wireless profile and/or wireless protocol being used for the first wireless communication standard, $T_{PERIOD}$ may be the same duration as a previous transmission time period. The changed characteristic(s) may, however, result in a decrease in $T_1$, which would increase $T_2$.

At block 318, computer-executable instructions of the AFACD module(s) 118 may be executed to determine whether an additional change has occurred to the one or more characteristics. For example, the AFACD module(s) 118 may determine whether a different wireless profile and/or wireless protocol is being used for data transmissions using the first wireless communication standard. In response to a positive determination at block 318, the method 300 may again proceed from block 302. In response to a negative determination at block 318, the determination at block 318 may be performed again, and may be repeatedly performed until a positive determination is made. As long as a negative determination is made at block 318, $T_{PERIOD}$, $T_1$, and $T_2$ may remain unchanged. $F_{AGG}$ may, however, still change based on changes to DR.

Figure 4:
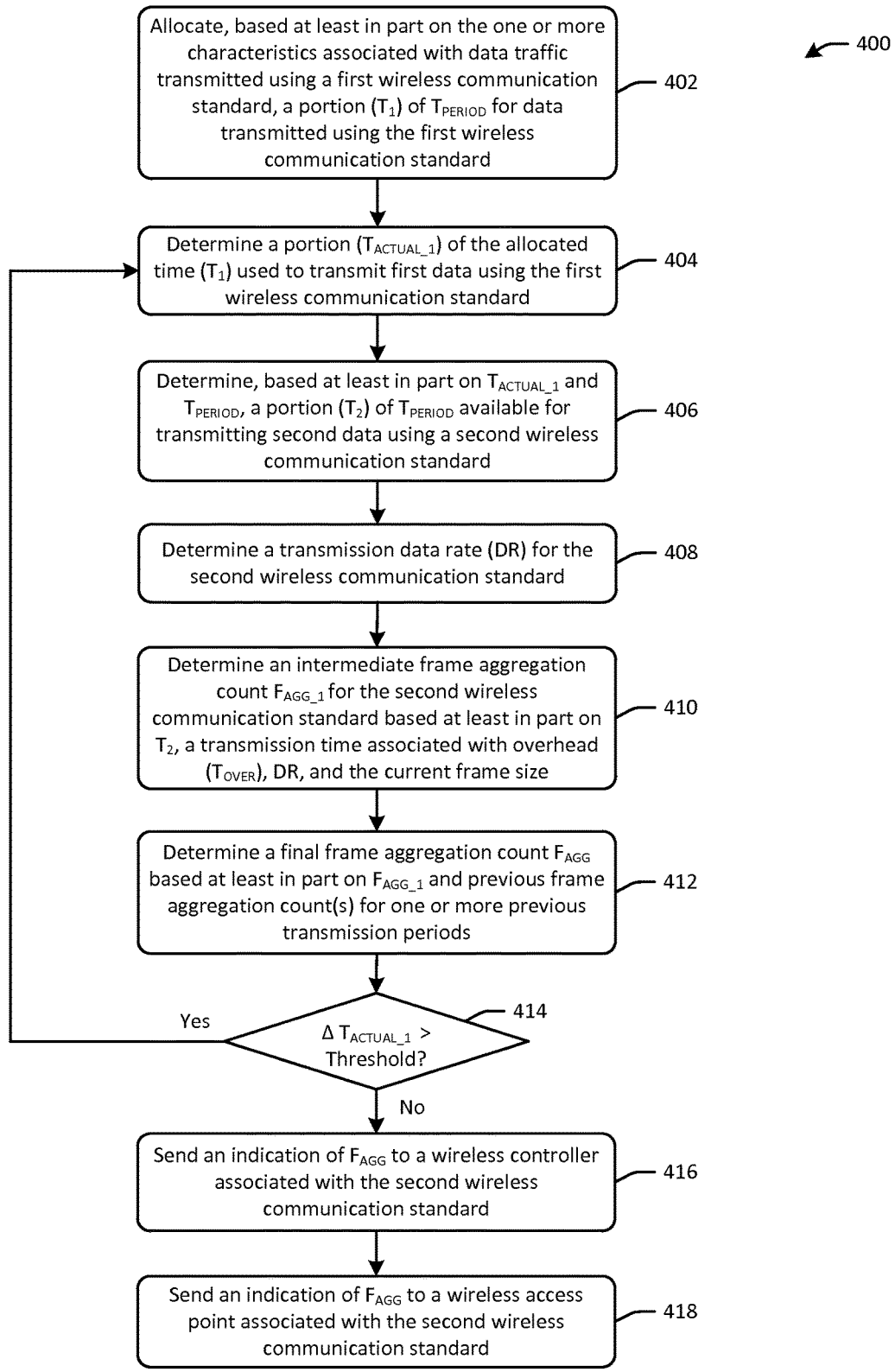
FIG. 4 is a process flow diagram of an illustrative method for determining an actual duration of data transmissions during a timeslot allocated for transmitting first data using a first wireless communication standard and utilizing a remaining available portion of the timeslot to transmit second data using a second wireless communication standard in accordance with one or more embodiments of the disclosure.

FIG. 4 is a process flow diagram of an illustrative method 400 for determining an actual duration of data transmissions during a timeslot allocated for transmitting first data using a first wireless communication standard and utilizing a remaining available portion of the timeslot to transmit second data using a second wireless communication standard in accordance with one or more embodiments of the disclosure.

At block 402, computer-executable instructions of the AFACD module(s) 118 may be executed to allocate, based at least in part on one or more characteristics (e.g., a wireless profile being used, a wireless protocol being used, etc.) associated with data traffic transmitted using a first wireless communication standard, a portion $T_1$ of $T_{PERIOD}$ for transmitting data using the first wireless communication standard. This allocation may occur as described earlier.

At block 404, computer-executable instructions of the AFACD module(s) 118 may be executed to determine a portion $T_{ACTUAL\_1}$ of the allocated time T1 actually used to transmit first data using the first wireless communication standard. In certain example embodiments of the disclosure, the amount of time $T_{ACTUAL\_1}$ needed to transmit data during the timeslot allocated to the first wireless communication standard may be less than the full allocated time T1.

At block 406, computer-executable instructions of the AFACD module(s) 118 may be executed to determine, based at least in part on $T_{ACTUAL\_1}$ and $T_{PERIOD}$, a portion $T_2$ of $T_{PERIOD}$ available for transmitting second data using a second wireless communication standard. In certain example embodiments of the disclosure, $T_2$ may be a longer duration than a duration of the timeslot that would have been made available to the second wireless communication standard based on the duration $T_1$ of the timeslot allocated to the first wireless communication standard. That is, since the entire duration $T_1$ of the timeslot allocated to the first wireless communication standard was not used, additional time in $T_{PERIOD}$ is available for transmissions using the second wireless communication standard beyond just $T_{PERIOD}-T_1$. Specifically, $T_1-T_{ACTUAL1}$ additional time in $T_{PERIOD}$ is available for transmissions using the second wireless communication standard.

At block 408, computer-executable instructions of the AFACD module(s) 118 may be executed to determine a transmission data rate (DR) for the second wireless communication standard. The DR may be measured by the wireless device 100 based at least in part on one or more channel conditions such as, for example, in scenarios in which the wireless device 100 is transmitting (e.g., uploading data) to another device (e.g., a wireless access point). In other example embodiments, such as those in which the wireless device 100 is receiving data from another device (e.g., downloading data from a wireless access point), the wireless device 100 may utilize a DR measured by the wireless access point.

At block 410, computer-executable instructions of the AFACD module(s) 118 may be executed to determine an intermediate frame aggregation count $F_{AGG\_1}$ for the second wireless communication standard using $T_2$, DR, $T_{OVER}$, and the current frame size ($F_{SIZE}$). More specifically, in certain example embodiments, computer-executable instructions of the AFACD module(s) 118 may be executed to determine $F_{AGG\_1}$ based on the following relationship: $F_{AGG\_1}=(T_2-T_{OVER})*DR/F_{SIZE}$. $T_2$ may be equal to $T_{PERIOD}-T_{ACTUAL1}$, and thus, may be greater than the duration (e.g., $T_{PERIOD}-T_1$) of the timeslot that would have been made available to the second wireless communication standard based on $T_1$ alone. The increase in $T_2$ that results from utilizing $T_{ACTUAL\_1}$ instead of $T_1$, results in a larger $F_{AGG\_1}$, and thus, a greater number of data frames (e.g., MSDUs) being aggregated into a PHY layer packet (e.g., a single PSDU) which, in turn, increases packet length and data throughput.

At block 412, computer-executable instructions of the AFACD module(s) 118 may be executed to determine a final frame aggregation count $F_{AGG}$ based at least in part on the intermediate frame aggregation count $F_{AGG\_1}$ and one or more previous frame aggregation counts calculated for one or more previous transmission time periods. The operation at block 412 may be performed in order to smooth out the calculated value of $F_{AGG}$ over multiple transmission time periods and minimize the impact of fluctuations in $T_{ACTUAL\_1}$. A set of operations that may be performed at block 412 is represented by illustrative method 500 of FIG. 5, which will be described in greater detail later in this disclosure.

Upon calculating the final frame aggregation count $F_{AGG}$ at block 412, computer-executable instructions of the AFACD module(s) 118 may be executed at block 414 to determine whether the value of $T_{ACTUAL\_1}$ for a subsequent transmission period has changed by more than a threshold amount from the value for a previous transmission period. For example, if it is determined that the value of $T_{ACTUAL\_1}$ has changed by more than a threshold amount based on the actual amount of data transmitted using the first wireless communication standard, the method 400 may again proceed from block 404 to determine a duration of time $T_2$ available for transmitting data using the second wireless communication standard based on the current value of $T_{ACTUAL\_1}$. The method 400 may then further proceed to determine a new intermediate $F_{AGG\_1}$ value, and ultimately, a new final $F_{AGG}$ value.

On the other hand, in response to a negative determination at block 414, computer-executable instructions of the AFACD module(s) 118 may be executed at block 416 to send the final frame aggregation count $F_{AGG}$, and optionally, additional parameters such as $T_{PERIOD}$, $T_1$, $T_{ACTUAL1}$, and/or $T_2$ to a wireless controller associated with the second wireless communication standard to enable a number of data frames (e.g., MSDUs) corresponding to the value of $F_{AGG}$ to be aggregated into a single PHY layer packet (e.g., a single PSDU). In addition, at block 418, computer-executable instructions of the AFACD module(s) 118 may be executed to send an indication of $F_{AGG}$ to a wireless access point associated with the second wireless communication standard. The wireless access point may then optionally use the $F_{AGG}$ value to determine a number of data frames to aggregate into data packets sent to the wireless device 100.

Figure 5:
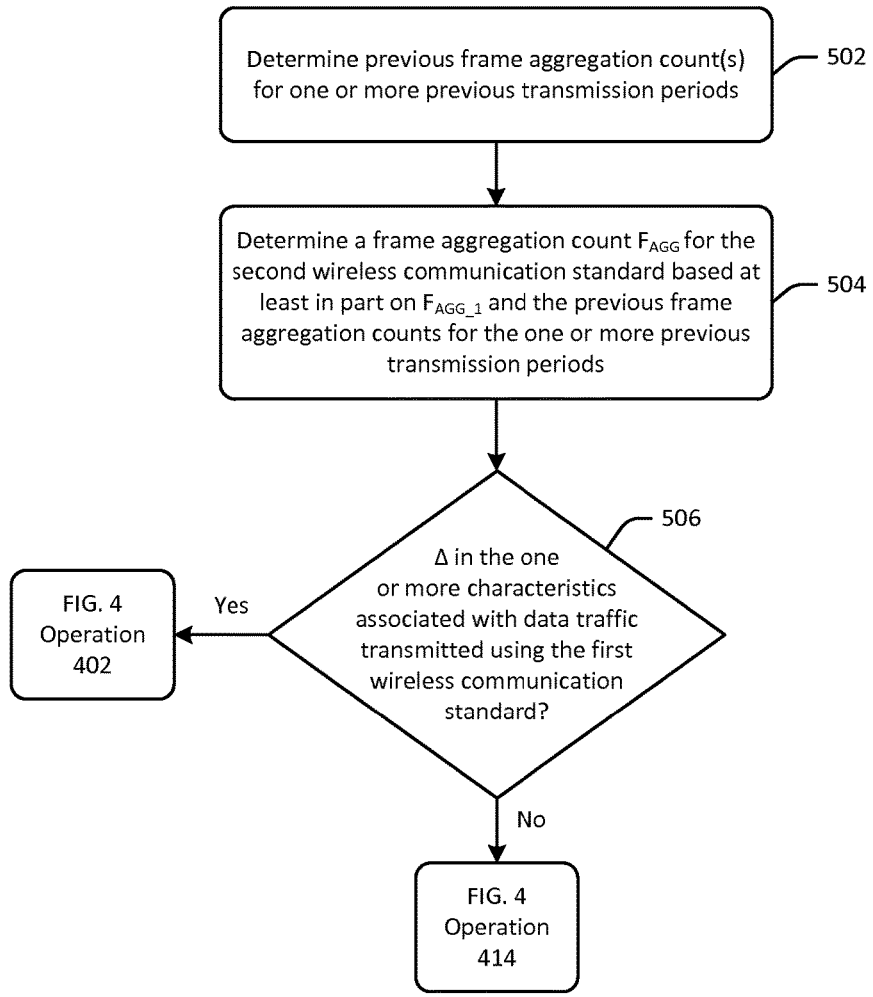
FIG. 5 is a process flow diagram of an illustrative method for determining a frame aggregation count for a wireless communication standard based at least in part on one or more frame aggregation counts associated with one or more previous transmission periods in accordance with one or more embodiments of the disclosure.

FIG. 5 is a process flow diagram of an illustrative method 500 for determining a frame aggregation count for a wireless communication standard based at least in part on one or more frame aggregation counts associated with one or more previous transmission periods in accordance with one or more embodiments of the disclosure. As previously noted, the operations of method 500 may represent sub-operations of operation 412 of FIG. 4.

At block 502, computer-executable instructions of the AFACD module(s) 118 may be executed to determine previous frame aggregation count(s) for one or more previous transmission periods. At block 504, computer-executable instructions of the AFACD module(s) 118 may be executed to determine a final frame aggregation count $F_{AGG}$ for the second wireless communication standard based at least in part on $F_{AGG\_1}$ (which was determined at block 410 of FIG. 4) and the previous frame aggregation counts for the one or more previous transmission periods. As an example, the AFACD module(s) 118 may average $F_{AGG\_1}$ calculated for a current transmission time period with one or more $F_{AGG}$s calculated for one or more previous transmission time periods. As another example, the AFACD module(s) 118 may choose the minimum $F_{AGG}$ for the X most recent transmission time periods as $F_{AGG\_2}$ for the current transmission time period.

At block 506, computer-executable instructions of the AFACD module(s) 118 may be executed to determine whether one or more characteristics associated with data traffic transmitted using the first wireless communication standard have changed. For example, the AFACD module(s) 118 may determine whether a wireless profile being used for the first wireless communication standard has changed, whether a wireless protocol being used for the first wireless communication standard has changed, and so forth. In response to a positive determination at block 506, operation 402 of the illustrative method 400 of FIG. 4 may be performed in order to determine a new allocation $T_1$ of $T_{PERIOD}$ for data transmitted using the first wireless communication standard. Subsequent operations of method 400 may then be performed as well. On the other hand, in response to a negative determination at block 506, the determination at block 414 of the method 400 of FIG. 4 may be performed.

Illustrative Architecture

Figure 6:
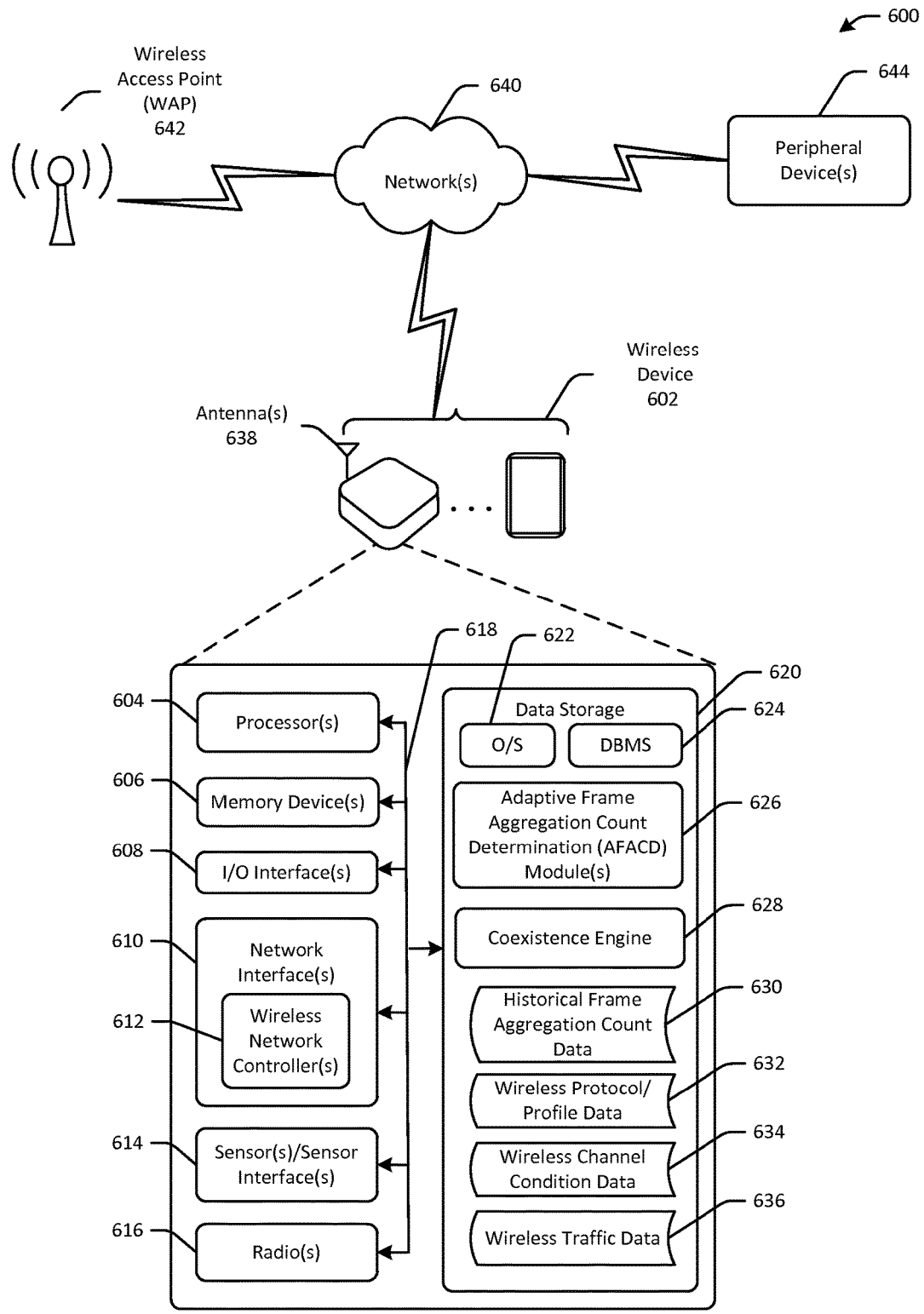
FIG. 6 is a schematic depiction of an illustrative networked architecture in accordance with one or more example embodiments of the disclosure.

FIG. 6 is a schematic depiction of an illustrative networked architecture 600 in accordance with one or more example embodiments of the disclosure. The networked architecture 600 may include a wireless access point (WAP) 642, one or more peripheral devices 644, and a wireless device 602. The WAP 642 may be, for example, a WiFi router. The wireless device 602 may be, for example, a smartphone, a tablet, a personal computer, a laptop computer, a content streaming device, a wearable computing device, or the like. The wireless device 602 may include any device capable of transmitting/receiving data using at least two different wireless communication standards such as, for example, the Bluetooth communication standard and a WiFi protocol of the IEEE 802.11 family of wireless communication standards. The wireless device 602 may correspond to an illustrative configuration of the wireless device 100. The peripheral device(s) 644 may include, for example, a remote control device, a gaming controller, a headset device, a wireless mouse, a wireless keyboard, a wireless speaker, a wireless microphone, or any other suitable device capable of communicating using a wireless communication standard such as the Bluetooth wireless communication standard.

The wireless device 602, the peripheral device(s) 644, and the WAP 642 may be configured to communicate via one or more networks 640. The network(s) 640 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 640 may have any suitable communication range associated therewith and may include, for example, global networks (e.g., the Internet), metropolitan area networks (MANs), wide area networks (WANs), local area networks (LANs), or personal area networks (PANs). In addition, the network(s) 640 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the wireless device 602 may include one or more processors (processor(s)) 604, one or more memory devices 606 (generically referred to herein as memory 606), one or more input/output ("I/O") interface(s) 608, one or more network interfaces 610, one or more sensors or sensor interface(s) 614, one or more radios 616, one or more antennas 638, and data storage 620. The network interface(s) 610 may, in turn, include one or more wireless network controller(s) 612 such as the Bluetooth controller 106 and the WiFi controller 114 depicted in FIG. 1. The wireless device 602 may further include one or more buses 618 that functionally couple various components of the device 602. These various components of the device 602 will be described in more detail hereinafter.

The antenna(s) 638 may include a cellular antenna for transmitting or receiving signals to/from a cellular network infrastructure, an antenna (e.g., the WiFi antenna 110) for transmitting or receiving Wi-Fi signals to/from the WAP 642, an antenna for receiving GNSS signals from a GNSS satellite, an antenna for transmitting or receiving Bluetooth signals (e.g., the Bluetooth antenna 102), and one or more other antennas such as, for example, a Near Field Communication (NFC) antenna for transmitting or receiving NFC signals. In certain example embodiments, the antenna(s) 638 may include a shared antenna capable of transmitting and receiving data using multiple different wireless communication standards.

The antenna(s) 638 may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) 638 may be communicatively coupled to one or more radios 616 (e.g., the Bluetooth radio 104, the WiFi radio 112, etc.) to which or from which signals may be transmitted or received.

As previously noted, the antenna(s) 638 may include the Wi-Fi antenna 110. The WiFi antenna 110 may be configured to transmit or receive signals in accordance with established standards and protocols, such as the IEEE 802.11 family of standards, including via 2.4 GHz channels (e.g. 802.11a, 802.11b, 802.11g, 802.11n, etc.), 5 GHz channels (e.g. 802.11n, 802.11ac, etc.), or 60 GHZ channels (e.g. 802.11ad).

If included among the antenna(s) 638, a cellular antenna may be configured to transmit or receive signals in accordance with established standards and protocols, such as GSM, 3G standards (e.g., Universal Mobile Telecommunications System (UMTS), Wideband Code Division Multiple Access (W-CDMA), CDMA2000, etc.), 4G standards (e.g., LTE, WiMax, etc.), direct satellite communications, or the like.

If included among the antenna(s) 638, a GNSS antenna may be configured to receive GNSS signals from three or more GNSS satellites carrying time-position information to triangulate a position therefrom. The GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The radio(s) 616 may include any suitable component(s) for, in cooperation with the antenna(s) 638, transmitting or receiving RF signals in the bandwidth and/or channels corresponding to the communications protocols utilized by the wireless device 602 to communicate with other devices. The radio(s) 616 may include hardware, software, and/or firmware for modulating, transmitting, or receiving—potentially in cooperation with any of antenna(s) 638—communications signals according to any of the communications protocols discussed above including, but not limited to, one or more Wi-Fi and/or Wi-Fi direct protocols, as standardized by the IEEE 802.11 standards, one or more Bluetooth protocols, or one or more cellular communications protocols or standards. The radio(s) 616 may further include hardware, firmware, or software for receiving GNSS signals from a corresponding antenna of the antenna(s) 638. The radio(s) 616 may include any known receiver and baseband suitable for communicating via the communications protocols utilized by the wireless device 602. The radio(s) 616 may further include a low noise amplifier (LNA), additional signal amplifiers, an analog-to-digital (A/D) converter, one or more buffers, digital baseband, or the like.

The sensor(s) 614 may include any suitable type of sensing device such as, for example, inertial sensors, force sensors, thermal sensors, and so forth. Example types of inertial sensors may include accelerometers (e.g., MEMS-based accelerometers), gyroscopes, and so forth.

The bus(es) 618 may include at least one of a system bus, a memory bus, an address bus, or a message bus, and may permit exchange of information (e.g., data (including computer-executable code), signaling, etc.) between various components of the device 602. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Type Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 606 of the device 602 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 606 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 606 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 606 and the data storage 620, removable and/or non-removable, are examples of computer-readable storage media (CRSM) as that term is used herein.

The data storage 620 may store computer-executable code, instructions, or the like that may be loadable into the memory 606 and executable by the processor(s) 604 to cause the processor(s) 604 to perform or initiate various operations. The data storage 620 may additionally store data that may be copied to memory 606 for use by the processor(s) 604 during the execution of the computer-executable instructions. Moreover, output data generated as a result of execution of the computer-executable instructions by the processor(s) 604 may be stored initially in memory 606, and may ultimately be copied to data storage 620 for non-volatile storage.

More specifically, the data storage 620 may store one or more operating systems (O/S) 622; one or more database management systems (DBMS) 624; a coexistence engine 628; one or more program modules, applications, or the like such as, for example, one or more AFACD module(s) 626; and various types of data such as historical frame aggregation count data 630, wireless protocol/profile data 632, wireless channel condition data 634, and wireless traffic data 636. The AFACD module(s) 626 may correspond to the AFACD module(s) 118 described earlier and may be configured to provide any of the functionality described in connection the AFACD module(s) 118. The AFACD module(s) 626 may include any number of sub-modules. The AFACD module(s) 626 may include computer-executable code, instructions, or the like that may be loaded into the memory 606 for execution by one or more of the processor(s) 604.

The historical frame aggregation count data 630 may include data indicative of $F_{AGG}$ values calculated for any number of prior transmission periods. The wireless protocol/profile data 632 may include data indicative of wireless profile(s) and/or wireless protocol(s) currently being used or previously used to transmit/receive data, and may further include data indicative of periodicities and timeslot allocation durations associated with various profile(s) and/or protocol(s). The wireless channel condition data 634 may include data indicative of channel conditions (e.g., SNR ratio) and/or data indicative of any number of other transmission parameter(s). The wireless traffic data 636 may include data indicative of an actual amount of data traffic transmitted or received using any given wireless communication standard. Any data (e.g., historical frame aggregation count data 630, wireless protocol/profile data 632, wireless channel condition data 634, and/or wireless traffic data 636) may be loaded in the memory 606 for use by the processor(s) 604 in executing computer-executable code of the AFACD module(s) 626. The DBMS 624 may be used to access any data. Further, data stored in one or more external datastores (not shown) may be accessed via the DBMS 624, stored in the data storage 620, and loaded in the memory 606 for use by the processor(s) 604 in executing computer-executable code of the AFACD module(s) 626.

External datastore(s) (or datastores internal to the device 602) may include, without limitation, databases (e.g., relational, object-oriented, etc.), file systems, flat files, distributed datastores in which data is stored on more than one node of a computer network, peer-to-peer network datastores, or the like. Such datastore(s) may provide redundant storage of any data. Any data stored in such datastore(s) may be generated by the wireless device 602, the WAP 642, and/or the peripheral device(s) 644. Further, any data stored in such datastore(s) may be generated by one component of the networked architecture 600, stored in the datastore(s), and retrieved from the datastore(s) by another component of the networked architecture 600.

The processor(s) 604 may be configured to access the memory 606 and execute computer-executable instructions loaded therein. For example, the processor(s) 604 may be configured to execute computer-executable instructions of the various program modules of the device 602 to cause or facilitate various operations to be performed in accordance with one or more embodiments of the disclosure. The processor(s) 604 may include any suitable processing unit capable of accepting data as input, processing the input data in accordance with stored computer-executable instructions, and generating output data. The processor(s) 604 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 604 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 604 may be capable of supporting any of a variety of instruction sets.

Referring now to other illustrative components depicted as being stored in the data storage 620, the O/S 622 may be loaded from the data storage 620 into the memory 606 and may provide an interface between other application software executing on the device 602 and hardware resources of the device 602. More specifically, the O/S 622 may include a set of computer-executable instructions for managing hardware resources of the device 602 and for providing common services to other application programs (e.g., managing memory allocation among various application programs). The O/S 622 may include any operating system now known or which may be developed in the future including, but not limited to, any proprietary or non-proprietary operating system.

The DBMS 624 may be loaded into the memory 606 and may support functionality for accessing, retrieving, storing, and/or manipulating data stored in the memory 606 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository.

Referring now to other illustrative components of the device 602, one or more input/output (I/O) interfaces 608 may be provided that may facilitate the receipt of input information by the device 602 from one or more I/O devices as well as the output of information from the device 602 to the one or more I/O devices. The I/O devices may include, for example, one or more user interface devices that facilitate interaction between a user and the device 602 including, but not limited to, a display, a keypad, a pointing device, a control panel, a touch screen display, a remote control device, a microphone, a speaker, and so forth. The I/O devices may further include, for example, data storage devices, printing devices, and so forth. The I/O devices may include any of the peripheral device(s) 644.

The device 602 may further include one or more network interfaces 610 via which the device 602 may communicate with any of a variety of other systems, platforms, networks, devices, and so forth. Such communication may occur via any of one or more of the network(s) 638.

It should be appreciated that the program modules described herein are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally or remotely may be provided to support functionality provided by the program modules described herein and/or additional or alternate functionality. Further, functionality may be modularized differently such that processing described as being supported collectively by a collection of program modules may be performed by a fewer or greater number of modules, or functionality described as being supported by any particular module may be supported, at least in part, by another module. In addition, program modules that support the functionality described herein may form part of one or more applications executable across any number of systems or devices of the system architecture 600 in accordance with any suitable computing model such as, for example, a client-server model, a peer-to-peer model, and so forth. In addition, any of the functionality described as being supported by any of the program modules described herein may be implemented, at least partially, in hardware and/or firmware across any number of devices.

It should further be appreciated that any illustrative component of the system architecture 600 may include alternate and/or additional hardware, software, or firmware components beyond those described or depicted without departing from the scope of the disclosure. More particularly, it should be appreciated that software, firmware, or hardware components depicted as forming part any illustrative component are merely illustrative and that some components may not be present or additional components may be provided in various embodiments. While various illustrative program modules have been depicted as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

It should be appreciated, however, that any of the operations of the methods 300-500 may be performed by any device or component of the system architecture 600. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of the methods 300-500 may be performed by, at least in part, by a wireless device 602 having the illustrative configuration shown in FIG. 6, it should be appreciated that the methods 300-500 may be implemented in connection with numerous other architectural and device level configurations.

The operations described and depicted in the illustrative methods 300-500 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in methods 300-500 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether That which is claimed is:

1. A method performed by a wireless device, the method comprising:
   determining a first time period for transmitting first data for a first Bluetooth profile using a Bluetooth protocol and for transmitting second data using a WiFi protocol;
   allocating a first timeslot of the first time period for transmitting the first data;
   determining a duration of a second timeslot of the first time period for transmitting the second data using the WiFi protocol by subtracting a duration of the first timeslot from a duration of the first time period;
   determining a data transmission rate associated with the WiFi protocol;
   determining an amount of the second data to be transmitted during the second timeslot by multiplying the duration of the second timeslot by the data transmission rate associated with the WiFi protocol and subtracting overhead;
   determining a first frame aggregation count for transmitting the second data by dividing the amount of the second data by a data frame size associated with the WiFi protocol, the first frame aggregation count indicating a first number of data frames containing the second data to be aggregated into a first single data packet;
   sending the first frame aggregation count to at least one of a WiFi controller of the wireless device or a wireless access point, wherein the wireless device transmits or receives the second data in the first number of data frames during the second timeslot;
   determining a second time period for transmitting third data for a second Bluetooth profile and for transmitting fourth data using the WiFi protocol;
   allocating a third timeslot of the second time period for transmitting the third data;
   determining a duration of a fourth timeslot of the second time period for transmitting the fourth data using the WiFi protocol by subtracting a duration of the third timeslot from a duration of the second time period, wherein the duration of the fourth timeslot is greater than the duration of the second timeslot;
   determining an amount of the fourth data to be transmitted during the fourth timeslot by multiplying the duration of the fourth timeslot by the data transmission rate associated with the WiFi protocol and subtracting the overhead, wherein the amount of the fourth data is greater than the amount of the second data;
   determining a second frame aggregation count for transmitting the fourth data by dividing the amount of the fourth data by the data frame size associated with the WiFi protocol, the second frame aggregation count indicating a second number of data frames containing the fourth data to be aggregated into a second single data packet, the second number of data frames being greater than the first number of data frames; and
   sending the second frame aggregation count to at least one of the WiFi controller or the wireless access point, wherein the wireless device transmits or receives the fourth data in the second number of data frames during the fourth timeslot.

2. The method of claim 1, further comprising:
   determining a first frequency of data transmissions between the wireless device and a first peripheral device for the first Bluetooth profile, wherein determining the first time period comprises determining the first time period based on the first frequency of data transmissions;
   determining a second frequency of data transmissions between the wireless device and a second peripheral device for the second Bluetooth profile;
   determining that the first frequency is greater than the second frequency; and
   selecting the duration of the second time period to be longer than the duration of the first time period.

3. The method of claim 1, wherein determining the first timeslot comprises selecting a first maximum amount of time needed to transmit the first data for the first Bluetooth profile as the duration of the first timeslot, and wherein determining the third timeslot comprises selecting a second maximum amount of time needed to transmit the third data for the second Bluetooth profile as the duration of the third timeslot, the second maximum amount of time being less than the first maximum amount of time.

4. The method of claim 1, further comprising:
   determining an actual amount of time during which the wireless device transmits or receives the third data during the third timeslot, the actual amount of time being determined by one or more transmission channel conditions;
   determining that the actual amount of time is less than the duration of the third timeslot; and
   allocating a portion of the third timeslot for transmitting fifth data using the WiFi protocol.

5. A method performed by a wireless device, comprising:
   determining a first time period for transmitting first data for a first wireless profile using a first wireless protocol of a first wireless transmission standard and for transmitting second data using a second wireless protocol of a second wireless transmission standard;
   allocating a first timeslot of the first time period for transmitting the first data;
   determining a second timeslot of the first time period for transmitting the second data using the second wireless protocol;
   determining a first frame aggregation count for transmitting the second data, the first frame aggregation count indicating a first number of data frames containing the second data to be aggregated into a first single data packet;
   determining a second time period for transmitting third data for a second wireless profile using a third wireless protocol of the first wireless transmission standard and for transmitting fourth data using the second wireless protocol;
   allocating a third timeslot of the second time period for transmitting the third data using the second wireless profile;
   determining a fourth timeslot of the second time period for transmitting the fourth data using the second wireless protocol, wherein a duration of the fourth timeslot is greater than the duration of the second timeslot;
   determining a second frame aggregation count for transmitting the fourth data, the second frame aggregation count indicating a second number of data frames containing the fourth data to be aggregated into a second single data packet, the second number of data frames being greater than the first number of data frames; and
   sending the second frame aggregation count to at least one of a wireless controller of the wireless device or a wireless access point, wherein the wireless device transmits or receives the fourth data in the second number of data frames during the fourth timeslot.

6. The method of claim 5, wherein the first wireless profile is a first Bluetooth profile and the second wireless profile is a second Bluetooth profile that is different from the first Bluetooth profile, wherein the first wireless protocol and the third wireless protocol are each Bluetooth protocols, and wherein the second wireless protocol is a WiFi protocol.

7. The method of claim 5, wherein determining the second timeslot comprises determining the duration of the second timeslot by subtracting a duration of the first timeslot from a duration of the first time period, and wherein determining the fourth timeslot comprises determining the duration of the fourth timeslot by subtracting a duration of the third timeslot from a duration of the second time period.

8. The method of claim 5, further comprising:
determining a data transmission rate associated with the second wireless protocol;
determining an amount of time associated with overhead;
subtracting the amount of time associated with overhead from the duration of the fourth timeslot to obtain a net amount of time for transmitting the fourth data; and
multiplying the net amount of time by the data transmission rate to obtain an amount of the fourth data to be transmitted during the fourth timeslot.

9. The method of claim 8, wherein the amount of time associated with overhead comprises at least one of: i) a transmission delay time associated with the second wireless protocol or ii) a transmission time for transmitting header data of the fourth data.

10. The method of claim 8, wherein determining the second frame aggregation count comprises dividing the amount of the fourth data by a data frame size associated with the second wireless protocol.

11. The method of claim 10, wherein determining the second frame aggregation count further comprises multiplying a result of the dividing by a weighting factor associated with the second wireless profile.

12. The method of claim 5, further comprising:
determining a third time period for transmitting fifth data for a third wireless profile using a fourth wireless protocol of the first wireless transmission standard and for transmitting sixth data using the second wireless protocol;
allocating a fifth timeslot of the third time period for transmitting the fifth data;
determining a sixth timeslot of the third time period for transmitting the sixth data using the second wireless protocol;
determining an amount of the sixth data to be transmitted during the sixth timeslot based at least in part on a duration of the sixth timeslot;
determining, based at least in part on the amount of the sixth data, a third frame aggregation count;
determining a fourth frame aggregation count based at least in part on one or more of the first frame aggregation count, the second frame aggregation count, or the third frame aggregation count, the fourth frame aggregation count indicating a third number of data frames containing the sixth data to be aggregated into a third single data packet; and
sending the fourth frame aggregation count to at least one of the wireless controller or the wireless access point, wherein the wireless device transmits or receives the sixth data in the third number of data frames during the sixth timeslot.

13. The method of claim 5, further comprising:
determining a third time period for transmitting fifth data for a third wireless profile using a fourth wireless protocol of the first wireless transmission standard and for transmitting sixth data using the second wireless protocol;
allocating a fifth timeslot of the third time period for transmitting the fifth data;
determining a sixth timeslot of the third time period for transmitting the sixth data using the second wireless protocol, wherein a duration of the sixth timeslot is less than the duration of the second timeslot and less than the duration of the fourth timeslot;
determining a current frame size associated with the second wireless protocol;
determining that a duration of the sixth timeslot is insufficient for transmitting a data frame using the second wireless protocol, the data frame having the current frame size; and
segmenting the sixth data into multiple data packets.

14. The method of claim 5, further comprising:
determining a first frequency of data transmissions between the wireless device and a first peripheral device for the first wireless profile, wherein determining the first time period comprises determining the first time period based on the first frequency of data transmissions;
determining a second frequency of data transmissions between the wireless device and a second peripheral device for the second wireless profile;
determining that the first frequency is greater than the second frequency; and
selecting the duration of the second time period to be longer than the duration of the first time period based on determining that the first frequency is greater than the second frequency.

15. The method of claim 5, wherein determining the first timeslot comprises selecting a first maximum amount of time needed to transmit the first data using the first wireless profile as the duration of the first timeslot, and wherein determining the third timeslot comprises selecting a second maximum amount of time needed to transmit the third data using the second wireless profile as the duration of the third timeslot, the second maximum amount of time being less than the first maximum amount of time.

16. The method of claim 5, further comprising:
determining an actual amount of time during which the wireless device transmits or receives the third data during the third timeslot;
determining that the actual amount of time is less than the duration of the third timeslot; and
allocating a portion of the third timeslot for transmitting fifth data using the second wireless protocol.

17. The method of claim 5, wherein a duration of the first time period is the same as a duration of the second time period, and wherein a duration of first timeslot is greater than a duration of the third timeslot.

18. A wireless device comprising:
a wireless controller;
at least one memory storing computer-executable instructions; and
at least one processor operatively coupled to the wireless controller and the at least one memory, wherein the at least one processor is configured to execute the computer-executable instructions to:
determine a first time period for transmitting first data for a first wireless profile using a first wireless protocol of a first wireless transmission standard and for transmitting second data using a second wireless protocol of a second wireless transmission standard;

allocate a first timeslot of the first time period for transmitting the first data;

determine a second timeslot of the first time period for transmitting the second data using the second wireless protocol;

determine a first frame aggregation count for transmitting the second data, the first frame aggregation count indicating a first number of data frames containing the second data to be aggregated into a first single data packet;

determine a second time period for transmitting third data for a second wireless profile using a third wireless protocol of the first wireless transmission standard and for transmitting fourth data using the second wireless protocol;

allocate a third timeslot of the second time period for transmitting the third data;

determine a fourth timeslot of the second time period for transmitting the fourth data using the second wireless protocol, wherein a duration of the fourth timeslot is greater than a duration of the second timeslot;

determine a second frame aggregation count for transmitting the fourth data, the second frame aggregation count indicating a second number of data frames containing the fourth data to be aggregated into a second single data packet, the second number of data frames being greater than the first number of data frames; and send the second frame aggregation count to at least one of the wireless controller or a wireless access point, wherein the wireless device transmits or receives the fourth data in the second number of data frames during the fourth timeslot.

19. The wireless device of claim 18, wherein the at least one processor is further configured to execute the computer-executable instructions to:

determine a data transmission rate associated with the second wireless protocol;

determine an amount of time associated with overhead, wherein the amount of time associated with overhead comprises at least one of: i) a transmission delay time associated with the second wireless protocol or ii) a transmission time for transmitting header data of the fourth data;

subtract the amount of time associated with overhead from the duration of the fourth timeslot to obtain a net amount of time available for transmitting the fourth data; and multiply the net amount of time by the data transmission rate to obtain an amount of the fourth data to be transmitted during the fourth timeslot.

20. The wireless device of claim 19, wherein the at least one processor is configured to determine the second frame aggregation count by executing the computer-executable instructions to divide the amount of the fourth data by a data frame size associated with the second wireless protocol.

* * * * *